United States Patent [19]
Aoyama

[11] Patent Number: 5,843,195
[45] Date of Patent: Dec. 1, 1998

[54] APPARATUS FOR REDUCING CARBON MONOXIDE CONCENTRATION, APPARATUS FOR REDUCING METHANOL CONCENTRATION, AND FUEL REFORMER UTILIZING THE SAME

[75] Inventor: Satoshi Aoyama, Susono, Japan

[73] Assignee: Toyota Jidosha Kabushiki Kaisha, Toyota, Japan

[21] Appl. No.: 643,008

[22] Filed: May 3, 1996

[30] Foreign Application Priority Data

May 15, 1995 [JP] Japan .................................... 7-141207
Jan. 22, 1996 [JP] Japan .................................... 8-028663

[51] Int. Cl.$^6$ ............................. C10L 3/00; C10B 31/18; B01D 50/00; H01M 8/24
[52] U.S. Cl. ........................ 48/127.7; 422/177; 422/196; 429/17; 429/19; 423/246
[58] Field of Search .............................. 423/246; 429/17, 429/19; 422/177, 196; 48/127.7

[56] References Cited

U.S. PATENT DOCUMENTS

| | | | |
|---|---|---|---|
| 4,650,727 | 3/1987 | Vanderborgh et al. | 429/19 |
| 5,271,916 | 12/1993 | Vanderborgh et al. | 423/246 |
| 5,316,747 | 5/1994 | Pow et al. | 423/247 |
| 5,330,727 | 7/1994 | Trocciola et al. | 422/177 |
| 5,456,889 | 10/1995 | Pow et al. | 422/177 |
| 5,637,415 | 6/1997 | Meltser et al. | 429/17 |

FOREIGN PATENT DOCUMENTS

| | | |
|---|---|---|
| 0 650 922 | 5/1993 | European Pat. Off. . |
| 0 650 923 | 5/1995 | European Pat. Off. . |
| 5-201702 | 8/1993 | Japan . |
| 846153 | 10/1957 | United Kingdom . |
| 2 250 130 | 5/1992 | United Kingdom . |
| WO 95/08850 | 3/1995 | WIPO . |

OTHER PUBLICATIONS

Journal of Catalysis, vol. 142, pp. 254–262, 1993, Se H. Oh, et al., "Carbon Monoxide Removal from Hydrogen–Rich Fuel Cell Feedstreams by Selective Catalytic Oxidation".

IECEC, vol. 1, pp. 1.1203–1.1208, Aug. 8, 1993, Mahlon S. Wilson, et al., "Electrocatalysis Issues in Polymer Electrolyte Fuel Cells".

Patent Abstracts of Japan, vol. 95, No. 12, JP–A–07–315825, Dec. 5, 1995 & Chemical Abstracts, vol. 124, No. 16, Apr. 15, 1996, AN–207257, T. Fujimoto, "Oxidation of Co To Co2 and Manufacture of Hydrogen–Containing Gases for Fuel Cells".

*Primary Examiner*—Nina Bhat
*Attorney, Agent, or Firm*—Oblon, Sivak, McClelland, Maier & Neustadt, P.C.

[57] ABSTRACT

A fuel reformer (30) includes a reformer unit (32) for receiving supplies of methanol and water and producing a hydrogen-rich reformed gas and a partial oxidizing unit (34) filled with a platinum-ruthenium alloy catalyst for oxidizing carbon monoxide in the reformed gas produced by the reformer unit (32) preferentially over hydrogen in the reformed gas. The platinum-ruthenium alloy catalyst charged in the partial oxidizing unit (34) lowers the concentration of carbon monoxide in the hydrogen-rich gas containing a trace amount of methanol to several ppm in its active temperature range of 80° C. to 100° C. This structure enables a gaseous fuel having extremely low concentrations of methanol and carbon monoxide to be produced by the fuel reformer (30) and supplied to polymer electrolyte fuel cells having an extremely low allowable limit of carbon monoxide concentration.

30 Claims, 17 Drawing Sheets

APPARATUS FOR REDUCING CARBON MONOXIDE CONCENTRATION, APPARATUS FOR REDUCING METHANOL CONCENTRATION, AND FUEL REFORMER UTILIZING THE SAME

BACKGROUND OF THE INVENTION

1. Field of the Invention

The present invention relates to an apparatus for reducing concentration of carbon monoxide, an apparatus for reducing concentration of methanol, and a fuel reformer utilizing these apparatuses. More specifically, the present invention pertains to an apparatus for reducing concentration of carbon monoxide in a hydrogen-rich gas, which contains hydrogen, carbon monoxide, and methanol and has lower concentrations of carbon monoxide and methanol than concentration of hydrogen, as well as to an apparatus for reducing concentration of methanol in a hydrogen-rich gas, which contains hydrogen and methanol and has lower concentration of methanol than concentration of hydrogen. The present invention also pertains to a fuel reformer for producing a hydrogen-containing gaseous fuel from methanol.

2. Description of the Related Art

A known apparatus for reducing concentration of carbon monoxide, for example, one disclosed in JAPANESE PATENT LAYING-OPEN GAZETTE No. 5-201702, includes a selective oxidizing unit filled with a rhodium and ruthenium-containing catalyst. The apparatus leads oxygen as well as a hydrogen-rich gas containing a lower concentration of carbon monoxide than concentration of hydrogen into the selective oxidizing unit, and oxidizes carbon monoxide in the hydrogen-rich gas to lower the concentration of carbon monoxide. In this apparatus, the rhodium and ruthenium-containing catalyst charged in the selective oxidizing unit accelerates oxidation of carbon monoxide in the hydrogen-rich gas preferentially over hydrogen.

The amount of oxygen introduced into the selective oxidizing unit is determined to be not less than a molar equivalent in order to minimize concentration of carbon monoxide in the hydrogen-rich gas, but to be within a predetermined range in order to prevent hydrogen from being subjected to combustion and wastefully consumed by excess oxygen. The molar equivalent is defined as the molar ratio of oxygen introduced into the selective oxidizing unit to carbon monoxide in the hydrogen-rich gas $[O_2]/[CO]=0.5$.

The following gives the reason for reducing the concentration of carbon monoxide in the hydrogen-rich gas. When the hydrogen-rich gas is supplied as a gaseous fuel, for example, to polymer electrolyte fuel cells or phosphate fuel cells for generating electric power through electrode reactions expressed as Equations (1) and (2) given below, carbon monoxide in the hydrogen-rich gaseous fuel is undesirably adsorbed to a platinum catalyst on the electrodes of the fuel cells. The adsorbed carbon monoxide lowers the activity of catalyst and interferes with the anode reaction, that is, decomposition of hydrogen, thereby deteriorating the performance of the fuel cells. The concentration of carbon monoxide in the hydrogen-rich gas after the selective oxidization reaction is not greater than an allowable limit of carbon monoxide concentration of the fuel cells, to which the hydrogen-rich gas is supplied. BY way of example, the allowable limit is several % or less for the phosphate fuel cells and several ppm or less for the polymer electrolyte fuel cells.

Anode reaction: $H_2 \rightarrow 2H^+ + 2e^-$     (1)

Cathode reaction: $2H^+ + 2e^- + (½)O_2 \rightarrow H_2O$     (2)

When the hydrogen-rich gas is contaminated with methanol, however, the known apparatus, which preferentially oxidizes carbon monoxide in the hydrogen-rich gas with the rhodium and ruthenium-containing catalyst, can not sufficiently reduce the concentration of carbon monoxide. When the hydrogen-rich gas processed with such an apparatus is supplied as a gaseous fuel to polymer electrolyte fuel cells having an extremely low allowable limit of carbon monoxide concentration, the carbon monoxide concentration in the hydrogen-rich gas often exceeds the allowable limit of the fuel cells. This causes the platinum catalyst on the electrodes of the fuel cells to be poisoned and undesirably deteriorates the performance of the fuel cells.

Reformers for reforming methanol are generally used to obtain a hydrogen-rich gas containing a lower concentration of carbon monoxide than concentration of hydrogen. Such reformers typically produce a hydrogen and carbon dioxide-containing hydrogen-rich reformed gas from methanol and water through reactions expressed as Equations (3) and (4) (total reaction expressed as Equation (5)). In the actual state, however, the reactions of Equations (3) and (4) do not completely proceed in the reformer. The reformed gas is accordingly contaminated with unreacted methanol and carbon monoxide as a by-product.

$CH_3OH \rightarrow CO + 2H_2 - 21.7$ kcal/mol     (3)

$CO + H_2O \rightarrow CO_2 + H_2 + 9.8$ kcal/mol     (4)

$CH_3HO + H_2O \rightarrow CO_2 + 3H_2 - 11.9$ kcal/mol     (5)

In a fuel reformer system where the reformer for reforming methanol and producing a hydrogen-rich gas is combined with the selective oxidizing unit filled with the rhodium and ruthenium-containing catalyst, methanol existing in the hydrogen-rich gas prevents the selective oxidizing unit from sufficiently lowering the concentration of carbon monoxide in the hydrogen-rich gas. The hydrogen-rich gas produced by the selective oxidizing unit of such a fuel reformer system can thus not be supplied to hydrogen-consuming mechanisms having an extremely low allowable limit of carbon monoxide concentration, such as polymer electrolyte fuel cells.

When the reformed gas is supplied to the polymer electrolyte fuel cells, methanol included in the reformed gas permeates through the electrolyte membrane and moves from the anode to the cathode. The methanol reacts with oxygen on the cathode to decrease the cathode potential and is adsorbed to the platinum catalyst, although the degree of adsorption of methanol is lower than that of carbon monoxide. The adsorbed methanol lowers the activity of catalyst and interferes with the decomposition of hydrogen, thereby deteriorating the performance of the fuel cells. This has been proved by the experimental data.

SUMMARY OF THE INVENTION

One object of the present invention is thus to provide an apparatus for sufficiently reducing concentration of carbon monoxide in a hydrogen-rich gas containing carbon monoxide and methanol.

Another object of the present invention is to provide an apparatus for sufficiently reducing concentration of methanol in a methanol-containing hydrogen-rich gas.

Still another object of the present invention is to provide a fuel reformer system for sufficiently reducing concentrations of carbon monoxide and methanol in a reformed gas produced by reforming methanol.

The above and the other related objects are realized at least partly by a first apparatus for reducing concentration of carbon monoxide in a hydrogen-rich gas, which contains hydrogen, carbon monoxide, and methanol, wherein the carbon monoxide and methanol having lower concentrations the hydrogen, the apparatus comprising: oxidizing gas introduction means for introducing an oxygen-containing oxidizing gas into the hydrogen-rich gas; and a preferential oxidizing unit containing a platinum-ruthenium alloy catalyst for accelerating oxidation of the carbon monoxide in the hydrogen-rich gas by the oxidizing gas preferentially over oxidation of the hydrogen in the hydrogen-rich gas.

In the first carbon monoxide concentration-reducing apparatus of the present invention, the preferential oxidizing unit filled with the platinum-ruthenium alloy catalyst can significantly lower the concentration of carbon monoxide in the methanol-containing hydrogen-rich gas. This structure enables the hydrogen-rich gas having extremely low concentration of carbon monoxide to be supplied to hydrogen-consuming mechanisms having an extremely low allowable limit of carbon monoxide concentration, such as polymer electrolyte fuel cells.

In accordance with one aspect of the present invention, the first carbon monoxide concentration-reducing apparatus further includes: methanol concentration measuring means for measuring concentration of the methanol in the hydrogen-rich gas; carbon monoxide concentration measuring means for measuring concentration of the carbon monoxide in the hydrogen-rich gas; and oxidizing gas control means for controlling an amount of the oxidizing gas introduced into the hydrogen-rich gas by the oxidizing gas introduction means, based on the concentration of the methanol in the hydrogen-rich gas measured by the methanol concentration measuring means and the concentration of the carbon monoxide in the hydrogen-rich gas measured by the carbon monoxide concentration measuring means. This structure allows an appropriate amount of oxidizing gas to be introduced into the hydrogen-rich gas.

The present invention is also directed to a second apparatus for reducing concentration of carbon monoxide in a hydrogen-rich gas, which contains hydrogen, carbon monoxide, and methanol, wherein the carbon monoxide and methanol having lower concentrations the hydrogen, the apparatus comprising: oxidizing gas introduction means for introducing an oxygen-containing oxidizing gas into the hydrogen-rich gas; and an oxidizing unit having an inlet and an outlet for the hydrogen-rich gas, and containing a methanol-oxidizing catalyst and a carbon monoxide-oxidizing catalyst, the methanol-oxidizing catalyst accelerating oxidation of the methanol in the hydrogen-rich gas by the oxidizing gas preferentially over oxidation of the hydrogen in the hydrogen-rich gas, the carbon monoxide-oxidizing catalyst accelerating oxidation of the carbon monoxide in the hydrogen-rich gas by the oxidizing gas preferentially over hydrogen in the hydrogen-rich gas.

In the second carbon monoxide concentration-reducing apparatus of the present invention, the oxidizing unit filled with the methanol-oxidizing catalyst and the carbon monoxide-oxidizing catalyst can significantly lower the concentrations of methanol and carbon monoxide in the methanol and carbon monoxide-containing hydrogen-rich gas. This structure enables the hydrogen-rich gas having extremely low concentrations of methanol and carbon monoxide to be supplied to hydrogen-consuming mechanisms having an extremely low allowable limit of carbon monoxide concentration, such as polymer electrolyte fuel cells.

In accordance with one aspect of the second carbon monoxide concentration-reducing apparatus, the methanol-oxidizing catalyst and the carbon monoxide-oxidizing catalyst are homogeneously mixed in the oxidizing unit. A ratio of the methanol-oxidizing catalyst and the carbon monoxide-oxidizing catalyst is arranged in the oxidizing unit so that the ratio at proximity to the an inlet of the hydrogen-rich gas greater than a ratio of the methanol-oxidizing catalyst to the carbon monoxide-oxidizing catalyst at an outlet of the hydrogen-rich gas. Either of these structures may further include cooling means having a circulation path, through which a cooling medium flows from proximity to the outlet to proximity to the inlet of the oxidizing unit, the cooling means cooling the oxidizing unit by the cooling medium.

In accordance with still another aspect of the present invention, the second carbon monoxide concentration-reducing apparatus further includes cooling means having a circulation path for a cooling medium, the cooling medium being circulated through the circulation path to cool the oxidizing unit. In this structure, the ratio of the methanol-oxidizing catalyst and the carbon monoxide-oxidizing catalyst are arranged in the oxidizing unit so that the ratio at a place in the oxidizing unit near the circulation path is greater than that at another place apart from the circulation path. It is preferable that the circulation path of the cooling means enables the cooling medium to flow from proximity to the outlet of the oxidizing unit to proximity to the inlet of the the oxidizing unit.

In accordance with still another aspect of the second carbon monoxide concentration-reducing apparatus, the oxidizing gas introduction means comprises a plurality of fluid inlets penetrating into the oxidizing unit for introducing the oxidizing gas into the oxidizing unit. In this structure, a ratio of the methanol-oxidizing catalyst and the carbon monoxide-oxidizing catalyst are arranged in the oxidizing unit so that the ratio at a place in the oxidizing unit near the plurality of fluid inlets is greater than that at another place apart from the plurality of fluid inlets.

The second carbon monoxide concentration-reducing apparatus may further include methanol concentration measuring means for measuring concentration of the methanol in the hydrogen-rich gas; carbon monoxide concentration measuring means for measuring concentration of the carbon monoxide in the hydrogen-rich gas; and oxidizing gas control means for controlling an amount of the oxidizing gas introduced into the hydrogen-rich gas by the oxidizing gas introduction means, based on the concentration of the methanol in the hydrogen-rich gas measured by the methanol concentration measuring means and the concentration of the carbon monoxide in the hydrogen-rich gas measured by the carbon monoxide concentration measuring means. This structure allows an appropriate amount of oxidizing gas to be introduced into the hydrogen-rich gas.

The present invention is also directed to an apparatus for reducing concentration of methanol in a hydrogen-rich gas, which contains hydrogen and methanol, wherein the methanol has lower concentration than the hydrogen, the apparatus comprising: oxidizing gas introduction means for introducing an oxygen-containing oxidizing gas into the hydrogen-rich gas; and a preferential oxidizing unit containing a catalyst for accelerating oxidation of the methanol in the hydrogen-rich gas by the oxidizing gas preferentially over oxidation of the hydrogen in the hydrogen-rich gas.

In the methanol concentration-reducing apparatus of the present invention, the preferential oxidizing unit filled with the catalyst can significantly lower the concentration of methanol in the hydrogen-rich gas. This structure enables the hydrogen-rich gas having extremely low concentration of methanol to be supplied to hydrogen-consuming mechanisms having an extremely low allowable limit of methanol concentration.

It is preferable that the preferential oxidizing unit of the methanol concentration-reducing apparatus has a ruthenium catalyst carried thereon.

In accordance with one aspect of the present invention, the methanol concentration-reducing apparatus further includes: methanol concentration measuring means for measuring concentration of the methanol in the hydrogen-rich gas; and oxidizing gas control means for controlling an amount of the oxidizing gas introduced into the hydrogen-rich gas by the oxidizing gas introduction means, based on the concentration of the methanol in the hydrogen-rich gas measured by the methanol concentration measuring means. This structure allows an appropriate amount of oxidizing gas to be introduced into the hydrogen-rich gas.

The present invention is also directed to a first fuel reformer system for reforming methanol to a hydrogen-containing gaseous fuel, which includes: a reformer unit for producing a reformed gas from methanol, the reformed gas containing hydrogen, carbon monoxide and methanol; oxidizing gas introduction means for introducing an oxygen-containing oxidizing gas into the reformed gas; and a preferential oxidizing unit containing a platinum-ruthenium alloy catalyst for accelerating oxidation of the carbon monoxide in the reformed gas preferentially over oxidation of the hydrogen in the reformed gas.

In the first fuel reformer system of the present invention, the preferential oxidizing unit filled with the platinum-ruthenium alloy catalyst can significantly lower the concentration of carbon monoxide in the methanol-containing reformed gas. This structure enables a gaseous fuel having extremely low concentration of carbon monoxide to be supplied to hydrogen-consuming mechanisms having an extremely low allowable limit of carbon monoxide concentration, such as polymer electrolyte fuel cells.

In accordance with one aspect of the present invention, the first fuel reformer system further includes: methanol concentration measuring means for measuring concentration of methanol in the reformed gas; carbon monoxide concentration detection means for measuring concentration of carbon monoxide in the reformed gas; and oxidizing gas control means for controlling an amount of the oxidizing gas introduced into the reformed gas by the oxidizing gas introduction means, based on the concentration of the methanol in the reformed gas measured by the methanol concentration measuring means and the concentration of the carbon monoxide in the reformed gas measured by the carbon monoxide concentration measuring means. This structure allows an appropriate amount of oxidizing gas to be introduced into the reformed gas.

The present invention is further directed to a second fuel reformer system for reforming methanol to a hydrogen-containing gaseous fuel, which includes: a reformer unit for producing a reformed gas from methanol, the reformed gas containing hydrogen, carbon monoxide and methanol; oxidizing gas introduction means for introducing an oxygen-containing oxidizing gas into the reformed gas; and an oxidizing unit having an inlet and an outlet for the reformed gas, and containing a methanol-oxidizing catalyst and a carbon monoxide-oxidizing catalyst, the methanol-oxidizing catalyst accelerating oxidation of the methanol in the reformed gas by the oxidizing gas preferentially over oxidation of the hydrogen in the reformed gas, the carbon monoxide-oxidizing catalyst accelerating oxidation of the carbon monoxide in the reformed gas by the oxidizing gas preferentially over hydrogen in the reformed gas.

In the second fuel reformer system of the present invention, the oxidizing unit filled with the methanol-oxidizing catalyst and the carbon monoxide-oxidizing catalyst can significantly lower the concentrations of methanol and carbon monoxide in the reformed gas. This structure enables a gaseous fuel having extremely low concentrations of methanol and carbon monoxide to be supplied to hydrogen-consuming mechanisms having an extremely low allowable limit of carbon monoxide concentration, such as polymer electrolyte fuel cells.

In accordance with one aspect of the second fuel reformer system, the methanol-oxidizing catalyst and the carbon monoxide-oxidizing catalyst are homogeneously mixed in the oxidizing unit. A ratio of the methanol-oxidizing catalyst and the carbon monoxide-oxidizing catalyst is arranged in the oxidizing unit so that the ratio at proximity to the an inlet of the reformed gas greater than a ratio of the methanol-oxidizing catalyst to the carbon monoxide-oxidizing catalyst at an outlet of the reformed gas. Either of these preferable structures may further include cooling means having a circulation path, through which a cooling medium flows from proximity to the outlet to proximity to the inlet of the oxidizing unit, the cooling means cooling the oxidizing unit by the cooling medium.

In accordance with still another aspect of the present invention, the second fuel reformer system further includes cooling means having a circulation path for a cooling medium, the cooling medium being circulated through the circulation path to cool the oxidizing unit. In this structure, a ratio of the methanol-oxidizing catalyst and the carbon monoxide-oxidizing catalyst are arranged in the oxidizing unit so that the ratio at a place in the oxidizing unit near the circulation path is greater than that at another place apart from the circulation path. It is preferable that the circulation path of the cooling means enables the cooling medium to flow from proximity to the outlet of the oxidizing unit to proximity to the inlet of the the oxidizing unit.

In accordance with still another aspect of the second fuel reformer system, the oxidizing gas introduction means comprises a plurality of fluid inlets penetrating into the oxidizing unit for introducing the oxidizing gas into the oxidizing unit. In this structure, a ratio of the methanol-oxidizing catalyst and the carbon monoxide-oxidizing catalyst are arranged in the oxidizing unit so that the ratio at a place in the oxidizing unit near the plurality of fluid inlets is greater than that at another place apart from the plurality of fluid inlets.

In accordance with one aspect of the present invention, the second fuel reformer system further includes: methanol concentration measuring means for measuring concentration of the methanol in the reformed gas; carbon monoxide concentration measuring means for measuring concentration of the carbon monoxide in the reformed gas; and oxidizing gas control means for controlling an amount of the oxidizing gas introduced into the reformed gas by the oxidizing gas introduction means, based on the concentration of the methanol in the reformed gas measured by the methanol concentration measuring means and the concentration of the carbon monoxide in the reformed gas measured by the carbon monoxide concentration measuring means.

The present invention is further directed to a third fuel reformer system for reforming methanol to a hydrogen-containing gaseous fuel, which includes: a reformer unit for producing a reformed gas from methanol, the reformed gas containing hydrogen, carbon monoxide and methanol; oxidizing gas introduction means for introducing an oxygen-containing oxidizing gas into the reformed gas; and a preferential oxidizing unit containing a catalyst for accelerating oxidation of the methanol in the reformed gas by the oxidizing gas preferentially over oxidation of the hydrogen in the reformed gas.

In the third furl reformer system of the present invention, the preferential oxidizing unit filled with the catalyst can significantly lower the concentration of methanol in the reformed gas. This structure enables a gaseous fuel having extremely low concentration of methanol to be supplied to hydrogen-consuming mechanisms having an extremely low allowable limit of methanol concentration.

In accordance with one aspect of the present invention, the third fuel reformer system further includes: methanol concentration measuring means for measuring concentration of the methanol in the reformed gas; and oxidizing gas control means for controlling an amount of the oxidizing gas introduced into the reformed gas by the oxidizing gas introduction means, based on the concentration of the methanol in the reformed gas measured by the methanol concentration measuring means. This structure allows an appropriate amount of oxidizing gas to be introduced into the reformed gas.

In accordance with another aspect of the present invention, the third fuel reformer system further includes carbon monoxide-preferential oxidizing unit for receiving the oxidizing gas and a methanol-poor concentration-reformed gas which has been preferentially oxidized in said methanol-preferential oxidizing unit, and oxidizing carbon monoxide in the methanol-poor concentration-reformed gas preferentially over hydrogen. This gives a gaseous fuel having extremely low concentrations of methanol and carbon monoxide. The third fuel reformer system of this preferred structure further includes: methanol concentration measuring means for measuring concentration of the methanol in the reformed gas; and first oxidizing gas control means for controlling an amount of the oxidizing gas introduced into the reformed gas by the oxidizing gas introduction means, based on the concentration of the methanol in the reformed gas measured by the methanol concentration measuring means, carbon monoxide concentration measuring means for measuring concentration of carbon monoxide in the methanol-poor concentration-reformed gas; and second oxidizing gas control means for controlling an amount of the oxidizing gas introduced into the methanol-poor concentration-reformed gas in the carbon monoxide-preferential oxidizing unit, based on the concentration of carbon monoxide in the methanol-poor concentration-reformed gas measured by the carbon monoxide concentration measuring means. This structure allows an appropriate amount of oxidizing gas to be introduced into the reformed gas.

It is preferable that the methanol-preferential oxidizing unit of the third fuel reformer system has a ruthenium catalyst carried thereon.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
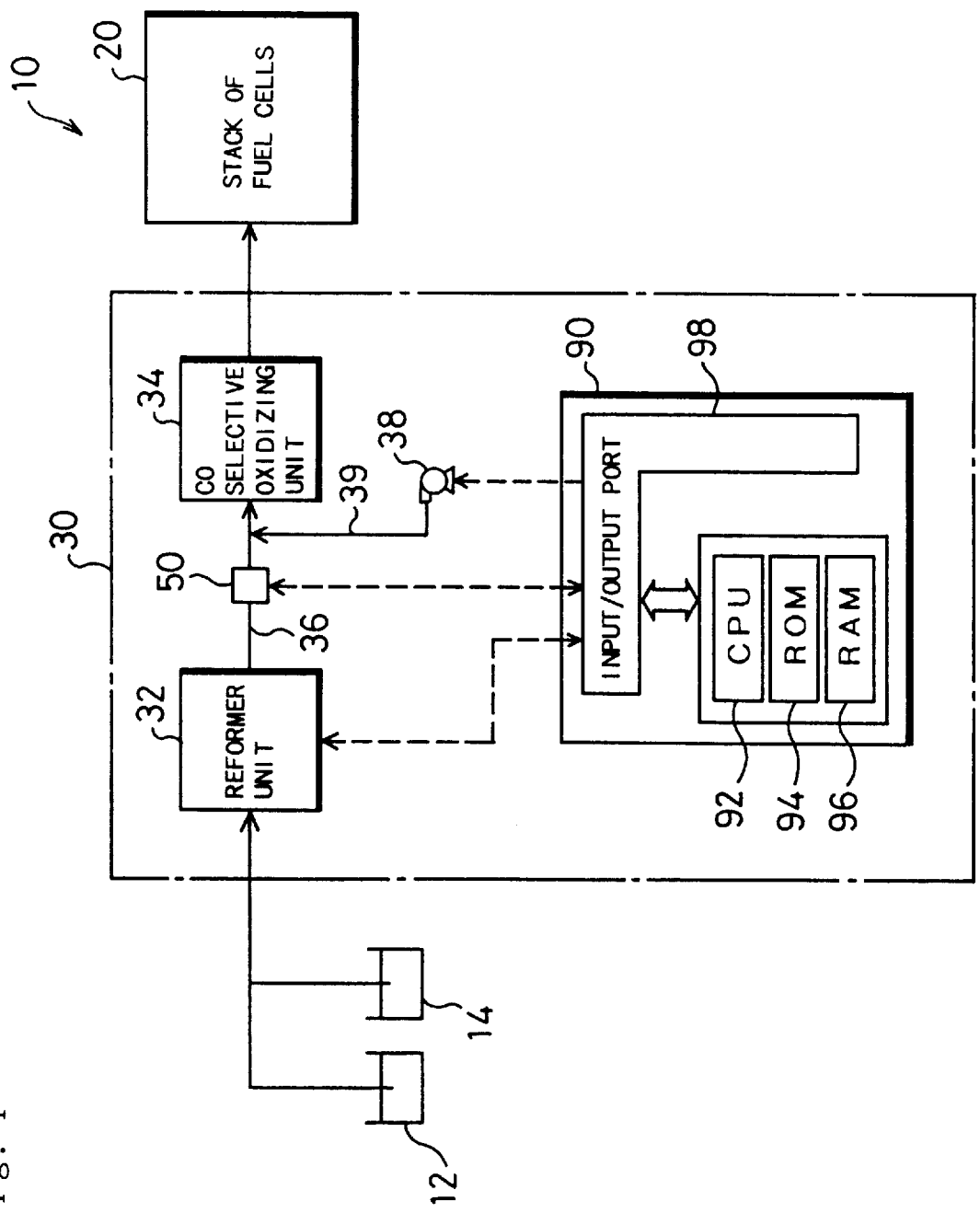
FIG. 1 is a block diagram schematically illustrating structure of a fuel cell system provided with a fuel reformer embodying the present invention.

FIG. 1 is a block diagram schematically illustrating structure of a fuel cell system 10 provided with a fuel reformer 30 embodying the present invention. The fuel cell system 10 includes a methanol reservoir 12 in which methanol is stored, a water reservoir 14 in which water is stored, the fuel reformer 30 for producing a hydrogen-containing gaseous fuel from methanol supplied from the methanol reservoir 12 and water supplied from the water reservoir 14, and a stack of polymer electrolyte fuel cells 20 for receiving a supply of the gaseous fuel from the fuel reformer 30 and a supply of an oxygen-containing oxidizing gas (for example, the air) and converting the chemical energy of the gaseous fuel to electrical energy.

Figure 2:
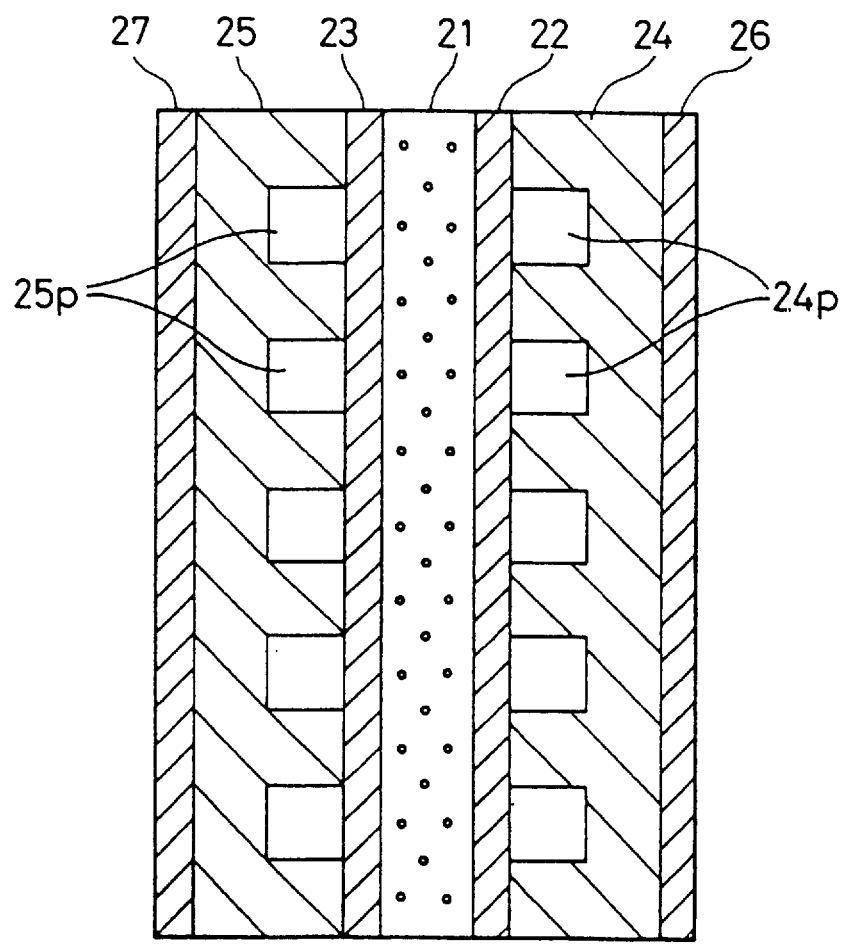
FIG. 2 is a cross sectional view schematically illustrating unit cell structure of the stack of fuel cells 20.

The stack of fuel cells 20 includes a plurality of polymer electrolyte fuel cells as mentioned above and have the unit cell structure illustrated in the cross sectional view of FIG. 2. The unit fuel cell includes an electrolyte membrane 21, an anode 22 and a cathode 23 arranged across the electrolyte membrane 21 to form a sandwich structure and work as gas diffusion electrodes, first and second separators 24 and 25 disposed across the sandwich structure and combined with the anode 22 and the cathode 23 to constitute flow paths 24p and 25p of the gaseous fuel and oxidizing gas, and first and second current collectors 26 and 27 disposed respectively outside the first and the second separators 24 and 25 to work as current-collecting electrodes of the anode 22 and the cathode 23. The electrolyte membrane 21 is composed of a polymer electrolyte material, such as a fluororesin, to be proton-conductive. The anode 22 and the cathode 23 are made of carbon cloth with a platinum catalyst or platinum-containing alloy catalyst carried thereon and arranged across the electrolyte membrane 21 via the catalyst-carrying faces thereof. As a matter of convenience of explanation, FIG. 2 shows the unit cell structure of the stack of fuel cells 20. In an actual configuration, however, plural sets of first separator 24 /anode 22/electrolyte membrane 21/cathode 23/second separator 25 are laid one upon another, and the first and the second current collectors 26 and 27 are disposed outside the plural sets to complete the stack of fuel cells 20. In the drawing of FIG. 1, only the gas supply system on the anode's side is shown whereas the gas supply system on the cathode's side and the gas discharge systems on both the anode's side and the cathode's side are omitted for the clarity of illustration.

The fuel reformer 30 includes a reformer unit 32 for receiving supplies of methanol and water and producing a hydrogen-rich reformed gas and a CO selective oxidizing unit 34 for oxidizing carbon monoxide in the reformed gas and thereby producing a hydrogen-rich gaseous fuel having lower concentration of carbon monoxide. The fuel reformer 30 is also provided with a connection conduit 36 for feeding a supply of the reformed gas produced by the reformer unit 32 to the CO selective oxidizing unit 34 and a concentration sensor 50 disposed in the connection conduit 36 for measuring concentrations of methanol and carbon monoxide included in the reformed gas. A blower 38 introduces an oxygen-containing oxidizing gas (for example, the air) into the connection conduit 36 via an induction pipe 39, which is connected to the connection conduit 36 downstream the concentration sensor 50. An electronic control unit 90 controls operations of the respective elements of the fuel reformer 30.

The reformer unit 32 receives a supply of methanol from the methanol reservoir 12 and a supply of water from the water reservoir 14 and produces a reformed gas containing hydrogen and carbon dioxide according to the reactions defined by Formulae (3) and (4) given above. As discussed previously, however, the reactions of Formulae (3) and (4) do not completely proceed in the practical state. The reformed gas produced by the reformer unit 32 is accordingly contaminated with trace amounts of unreacted methanol and carbon monoxide as a by-product of the reaction. The concentrations of carbon monoxide and methanol in the reformed gas depend upon the type of a catalyst charged into the reformer unit 32, the operating temperature of the reformer unit 32, and the flows of methanol and water per unit volume of catalyst supplied into the reformer unit 32. By way of example, it is assumed that a Cu—Zn catalyst is charged into the reformer unit 32, which has the volume of 12 liters and is operated at temperatures of 200° C. to 300° C., while both the flows of methanol and water fed into the reformer unit 32 are 100 ml per one minute. Under such conditions, the concentration of carbon monoxide in the reformed gas is approximately 1%, and that of methanol is not greater than approximately 1%.

Combination of the reactions of Formulae (3) and (4) gives an endothermic reaction expressed as Formula (5). In order to produce a required amount of heat for the reactions, the reformer unit 32 is further provided with a combustion unit (not shown), which receives part of methanol supplied from the methanol reservoir 12 and enables the supply of methanol to be subjected to combustion. The reformer unit 32 is connected to the electronic control unit 90 via a conductive line. The electronic control unit 90 controls the amount of supply of methanol into the combustion unit of the reformer unit 32, thereby regulating the operating temperature of the reformer unit 32. The electronic control unit 90 also controls supplies of methanol and water fed into the reformer unit 32.

The CO selective oxidizing unit 34 receives a supply of the reformed gas produced by the reformer unit 32 and a supply of oxidizing gas, oxidizes carbon monoxide in the reformed gas preferentially over hydrogen, and thereby changes the reformed gas to a gaseous fuel having lower concentration of carbon monoxide. The CO selective oxidizing unit 34 thus works as the preferential oxidizing reaction unit of the apparatus for reducing concentration of carbon monoxide. The CO selective oxidizing unit 34 is filled with a carrier having a platinum-ruthenium alloy catalyst (CO selective oxidizing catalyst) carried thereon. The concentration of carbon monoxide in the gaseous fuel produced by the CO selective oxidizing unit 34 depends upon the operating temperature of the CO selective oxidizing unit 34, the concentrations of carbon monoxide and methanol in the reformed gas fed into the CO selective oxidizing unit 34, and the flow of the reformed gas per unit volume of catalyst supplied into the CO selective oxidizing unit 34. By way of example, it is assumed that the CO selective oxidizing unit 34 has the volume of 3 liters and is operated at temperatures of 80° C. to 200° C. or more preferably 80° C. to 100° C., while the reformed gas given as the example in the above description is fed from the reformer unit 32 to the CO selective oxidizing unit 34. The reformed gas is obtained at the flows of 100 ml of methanol and 100 ml of water per minute fed into the reformer unit 32 and contains approximately 1% or less amount of carbon monoxide and methanol. Under such conditions, the concentration of carbon monoxide in the gaseous fuel is not greater than several ppm.

The CO selective oxidizing catalyst charged into the CO selective oxidizing unit 34 is prepared in the following manner. Porous ceramic alumina pellets of approximately 3 mm in diameter are soaked in distilled water. An aqueous solution of ruthenium chloride is added dropwise to the alumina pellets in the distilled water with stirring, so that the ruthenium salt is adsorbed onto the alumina pellets. The alumina pellets with the ruthenium salt adsorbed thereon are taken out of the solution and dried sufficiently before being heated in a hydrogen reducing atmosphere at temperatures of 250° C. to 350° C. for 2 hours. This heating process reduces ruthenium on the alumina pellets and completely removes the residual chlorine. The alumina pellets with ruthenium carried thereon is subsequently treated to carry platinum in a similar manner to the above ruthenium-carrying process. In the platinum-carrying process, an aqueous solution of platinum chloride is added dropwise to the alumina pellets soaked in distilled water, instead of the aqueous solution of ruthenium chloride. The alumina pellets with ruthenium and platinum carried thereon are heated in an inert stream (for example, in a stream of nitrogen or argon) at temperatures of 800° C. to 900° C. for one hour. This heating process changes platinum and ruthenium on the alumina pellets to an alloy and yields a platinum-ruthenium alloy catalyst working as the CO selective oxidizing catalyst.

The carrying density of the platinum-ruthenium alloy catalyst and the composition ratio of platinum to ruthenium can be set arbitrarily by regulating the amounts of ruthenium chloride and platinum chloride. Although the composition ratio of platinum to ruthenium is one to one in the embodiment, the composition ratio may be varied between 1 to 10 and 10 to 1, or more preferably between 1 to 3 and 3 to 1. The carrying density is generally 0.1% by weight to 1.0% by weight or more preferably 0.2% by weight to 0.5% by weight.

In the above production steps, the platinum-ruthenium alloy catalyst is prepared by making ruthenium and platinum adsorbed onto alumina pellets in this order. In accordance with other applicable processes, the platinum-ruthenium alloy catalyst may be obtained by making platinum and ruthenium adsorbed onto alumina pellets in this order or by simultaneously adding aqueous solutions of ruthenium chloride and platinum chloride dropwise to the alumina pellets soaked in distilled water to realize the concurrent adsorption. Any one or combination of ruthenium nitrate, ruthenium iodide, chloroethenic acid, ammonium chlororuthenate, ruthenium hydroxide, and potassium ruthenate may be used instead of ruthenium chloride in the above process for making ruthenium carried on the alumina pellets. Any one of platinum hydroxide, chloroplatinic acid, and ammonium chloroplatinate may also be used instead of platinum chloride in the above process for making platinum carried on the alumina pellets. The platinum-ruthenium alloy catalyst functioning as the CO selective oxidizing catalyst may be prepared according to any desired process other than the above procedure.

Figure 3:
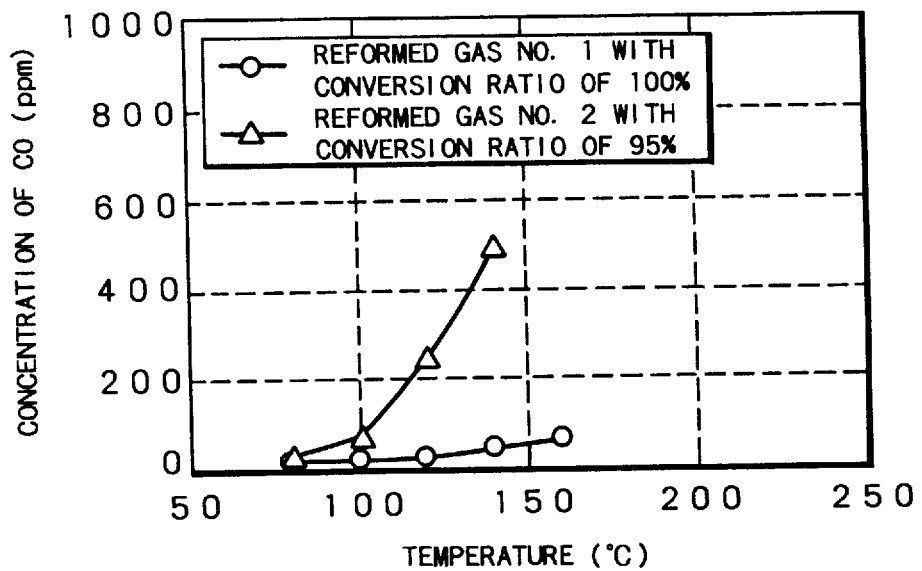
FIG. 3 is a graph showing capabilities of a platinum-ruthenium alloy catalyst in reducing concentration of carbon monoxide in model gases.
Figure 4:
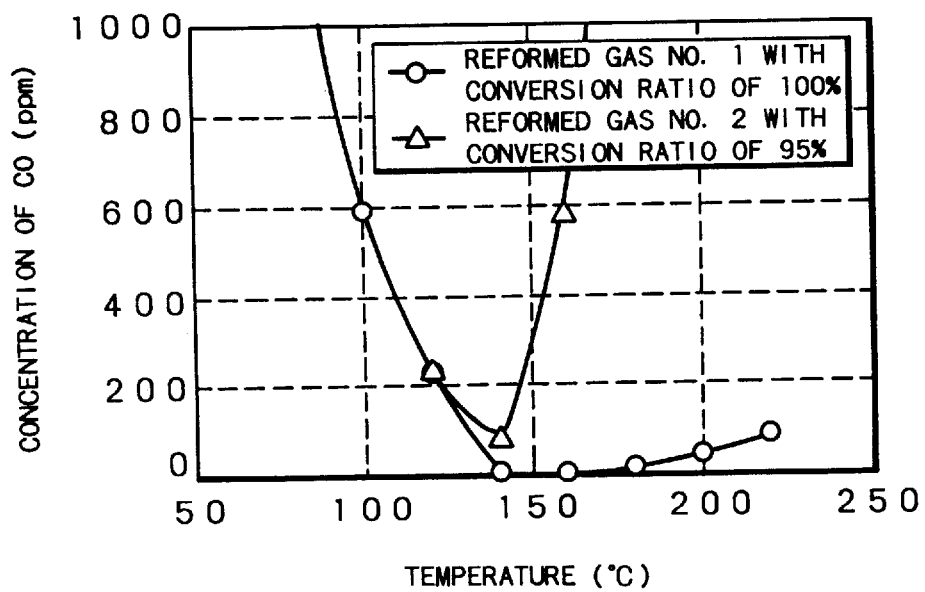
FIG. 4 is a graph showing capabilities of a ruthenium catalyst as a reference.

FIG. 3 is a graph showing capabilities of the platinum-ruthenium alloy catalyst in reducing concentration of carbon monoxide in model gases, whereas FIG. 4 is a graph showing the same of a ruthenium catalyst as a reference. The ruthenium catalyst used as a reference is alumina pellets with ruthenium carried thereon, which are obtained as an intermediate in the above process of manufacturing the platinum-ruthenium alloy catalyst.

A tank of a gas having composition of $H_2$ 32 75%, $CO_2$=24.5%, and CO=0.5% is prepared in advance. A reformed gas No. 1 is prepared by adding the water vapor to the gas with a bubbler to have the absolute humidity of approximately 20%. A reformed gas No. 2 is prepared by further adding 1% methanol to the reformed gas No. 1. The reformed gases No. 1 and No. 2 are used for the model gas. The reformed gas No. 1 corresponds to a gas composition wherein the molar ratio of water to methanol [$H_2O$]/[$CH_3OH$] fed into the reformer unit 32 of the embodiment is equal to the value '2' and the degree of conversion is 100%. The reformed gas No. 2 corresponds to another gas composition wherein the molar ratio of water to methanol [$H_2O$]/[$CH_3OH$] fed into the reformer unit 32 is equal to the value '2' and the degree of conversion is 95%.

A gaseous mixture is introduced into the respective catalysts at the gas flow per unit volume of catalyst equal to approximately 5000 $h^{-1}$ on the dry gas basis. The gaseous mixture is prepared by mixing an oxidizing gas with the model gas to attain the molar ratio of oxygen to carbon monoxide [$O_2$]/[CO] equal to the value '3'.

The graph of FIG. 4 shows variations in concentration of carbon monoxide in the reformed gas after the catalytic reaction when the ruthenium catalyst of reference is used. For the reformed gas No. 1 with the conversion ratio of 100% (methanol concentration: 0%), the concentration of carbon monoxide is not greater than 100 ppm in a wide range of reaction temperature between 130° C. and 220° C. and even not greater than several ppm in a range of reaction temperature between 140° C. and 180° C. For the reformed gas No. 2 with the conversion ratio of 95% (methanol concentration: approximately 1%), on the other hand, the concentration of carbon monoxide reaches its minimum of 80 ppm in the vicinity of 140° C. and does not decrease to any lower level.

The graph of FIG. 3 shows variations in concentration of carbon monoxide in the reformed gas after the catalytic reaction when the platinum-ruthenium alloy catalyst of the embodiment is charged into the CO selective oxidizing unit 34. As for the reformed gas No. 1 with the conversion ratio of 100%, the concentration of carbon monoxide is not greater than several ppm in a wide range of reaction temperature between 80° C. and 150° C. Even as to the reformed gas No. 2 with the conversion ratio of 95%, the concentration of carbon monoxide is not greater than several ppm in a range of reaction temperature between 80° C. and 100° C. Compared with the ruthenium catalyst of reference, the platinum-ruthenium alloy catalyst of the embodiment can significantly reduce the concentration of carbon monoxide in the methanol-containing reformed gas.

As discussed above, the platinum-ruthenium alloy catalyst can reduce the concentration of carbon monoxide to several ppm in a range of reaction temperature between 80° C. and 100° C. irrespective of the presence or absence of methanol. In order to allow the CO selective oxidizing unit 34 to be operated at temperatures of 80° C. to 100° C., the temperature of the reformed gas introduced into the CO selective oxidizing unit 34 should be regulated adequately. The regulation of temperature is implemented, for example, by the process of heat exchange of the reformed gas in the connection conduit 36 with supplies of methanol and water fed from the methanol reservoir 12 and the water reservoir 14 to the reformer unit 32, which is carried out in a heat exchanger (not shown). The heat exchange of the reformed gas in the connection conduit 36 with the supplies of methanol and water fed to the reformer unit 32 enhances the thermal efficiency and realizes a fuel reformer with higher energy efficiency.

Figure 5:
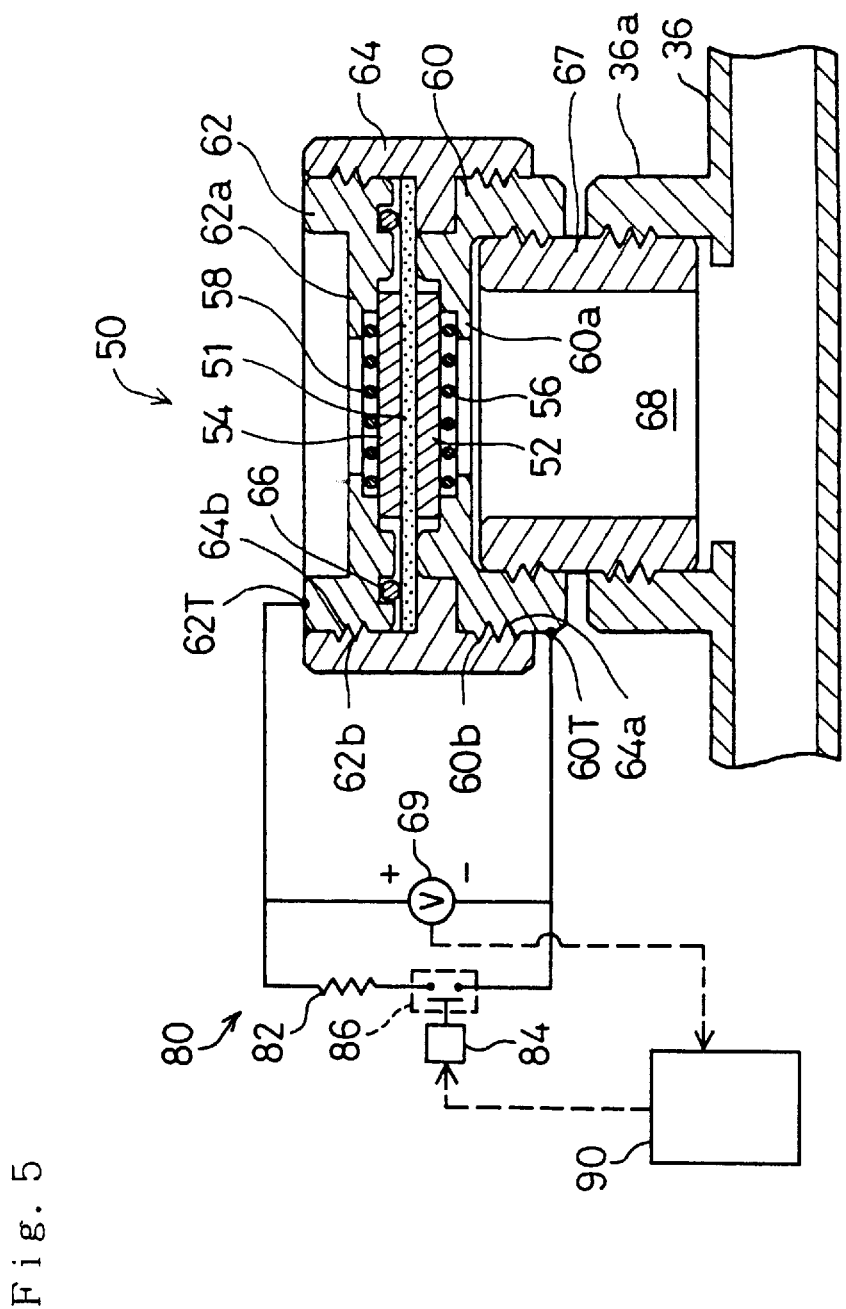
FIG. 5 schematically illustrates structure of the concentration sensor 50.

FIG. 5 schematically illustrates structure of the concentration sensor 50. The concentration sensor 50 includes an electrolyte membrane 51, a pair of electrodes 52 and 54 arranged across the electrolyte membrane 51 to form a sandwich structure, a pair of meshed metal plates 56 and 58 disposed cross the sandwich structure to prevent deflection of the sandwich structure, a pair of holders 60 and 62 for supporting the sandwich structure as well as the pair of meshed metal plates 56 and 58, an insulating member 64 for connecting the holders 60 and 62 with each other under electrically insulating conditions, and a target-of-measurement selection mechanism 80 for selecting the target of measurement among the concentration of methanol and the concentration of carbon monoxide. The electrolyte membrane 51 is composed of a polymer electrolyte material, such as a fluororesin, to be proton-conductive. The pair of electrodes 52 and 54 are made of carbon cloth with a platinum catalyst or platinum-containing alloy catalyst carried thereon and arranged across the electrolyte membrane 51 via the catalyst-carrying faces thereof. The holders 60 and 62 are made of a material having excellent electrical conductivity.

The holders 60 and 62 respectively have flanges 60a and 62a projected inward from the cylindrical holder structures. The electrolyte membrane 51, the pair of electrodes 52 and 54, and the meshed metal plates 56 and 58 are supported by these flanges 60a and 62a of the holders 60 and 62. The holder 62 is provided with an O-ring 66, which comes into contact with the electrolyte membrane 51 to prevent an atmosphere on the side of one electrode from leaking to the side of the other electrode. The holders 60 and 62 respectively have, on the circumference thereof, outer screw threads 60b and 62b, which mate and engage with internal screw threads 64a and 64b formed inside the insulating member 64. Engagement of the mating screw threads 60b, 62b and 64a, 64b connects the holders 60 and 62 with each other to ensure that the holders 60 and 62 securely support the sandwich structure of electrode 52-electrolyte membrane 51-electrode 54 placed therebetween.

The concentration sensor 50 further includes a passage member 67 joined with one holder 60 through engagement of mating screw threads to define a gas flow conduit 68 for leading the reformed gas to one electrode 52. The passage member 67 is composed of an insulating material and screwed to an attachment mouth 36a formed on the connection conduit 36. The other holder 62 does not connect with any specific gas conduit, which enables the other electrode 54 to be exposed to the atmosphere.

A voltmeter 69 is electrically connected with detection terminals 60T and 62T arranged on the holders 60 and 62 to measure the potential difference between the pair of electrodes 52 and 54. The voltmeter 69 is further connected to the electronic control unit 90. Connection of the voltmeter 69 is attained to give negative polarity to the detection terminal 60T of the holder 60 on the side of the electrode 52 exposed to the reformed gas and positive polarity to the detection terminal 62T of the holder 62 on the side of the electrode 54 exposed to the atmosphere.

The target-of-measurement selection mechanism 80 is arranged between the detection terminals 60T and 62T and connected to the voltmeter 69 in parallel via conductive lines. The target-of-measurement selection mechanism 80 includes a resistance 82, a relay 84, and a contact 86 of the relay 84. The resistance 82 is connected with the contact 86 of the relay 84 in series. The contact 86 of the relay 84 has a normal-open structure; that is, the contact 86 is open in OFF state of the relay 84 and closed in ON state of the relay 84. The relay 84 is connected to the electronic control unit 90 via a conductive line and controlled on and off by the electronic control unit 90.

In the concentration sensor 50 thus constructed, in the OFF state of the relay 84 or OPEN position of the contact 86, the concentration of methanol in the reformed gas is determined according to the potential difference (open terminal voltage between the electrodes 52 and 54) measured with the voltmeter 69. In the ON state of the relay 84 or CLOSED position of the contact 86, on the other hand, the concentration of carbon monoxide in the reformed gas is determined according to the potential difference (inter-terminal voltage of the resistance 82) measured with the voltmeter 69.

The concentration of methanol in the reformed gas is determined by measuring the open terminal voltage between the pair of electrodes 52 and 54. This is ascribed to the following fact. When a methanol-containing reformed gas is supplied to the structure including the electrolyte membrane 51 and the electrodes 52 and 54, which is identical with the cell structure of the polymer electrolyte fuel cells, the higher concentration of methanol in the reformed gas results in the lower open terminal voltage between the electrodes 52 and 54. A data map or curve is prepared in advance, which represents the relationship between the concentration of methanol in the reformed gas and the open terminal voltage between the electrodes 52 and 54. The concentration of methanol in the reformed gas corresponding to the potential difference measured with the voltmeter 69 is read from the data map or curve.

The concentration of carbon monoxide in the reformed gas is determined by measuring the inter-terminal voltage of the resistance 82. This is ascribed to the following fact. When a carbon monoxide-containing reformed gas is supplied to the structure including the electrolyte membrane 51 and the electrodes 52 and 54, which is identical with the cell structure of the polymer electrolyte fuel cells, the higher concentration of carbon monoxide in the reformed gas causes the greater amount of carbon monoxide to be adsorbed to the platinum catalyst carried on the electrode 52, thus interfering with the reaction on the electrode 52 and lowering the electromotive force. A data map or curve is prepared in advance, which represents the relationship between the concentration of carbon monoxide in the reformed gas and the inter-terminal voltage of the resistance 82. The concentration of carbon monoxide in the reformed gas corresponding to the inter-terminal voltage measured with the voltmeter 69 is read from the data map or curve.

The electronic control unit 90 is constructed as a logic circuit with a microcomputer. The electronic control unit 90 specifically includes a CPU 92 for executing a variety of operations according to preset control programs, a ROM 94 in which control programs and control data required for the execution of various operations by the CPU 92 have been stored in advance, and a RAM 96 into and from which a variety of data required for the execution of various operations by the CPU 92 are temporarily written and read. The electronic control unit 90 is further provided with an input/output port 98 for inputting signals sent from the voltmeter 69 of the concentration sensor 50 and detection signals output from a variety of sensors (not shown) and outputting driving signals, based on the results of operations by the CPU 92, to the reformer unit 32, the CO selective oxidizing unit 34, the blower 38, and the concentration sensor 50.

Figure 6:
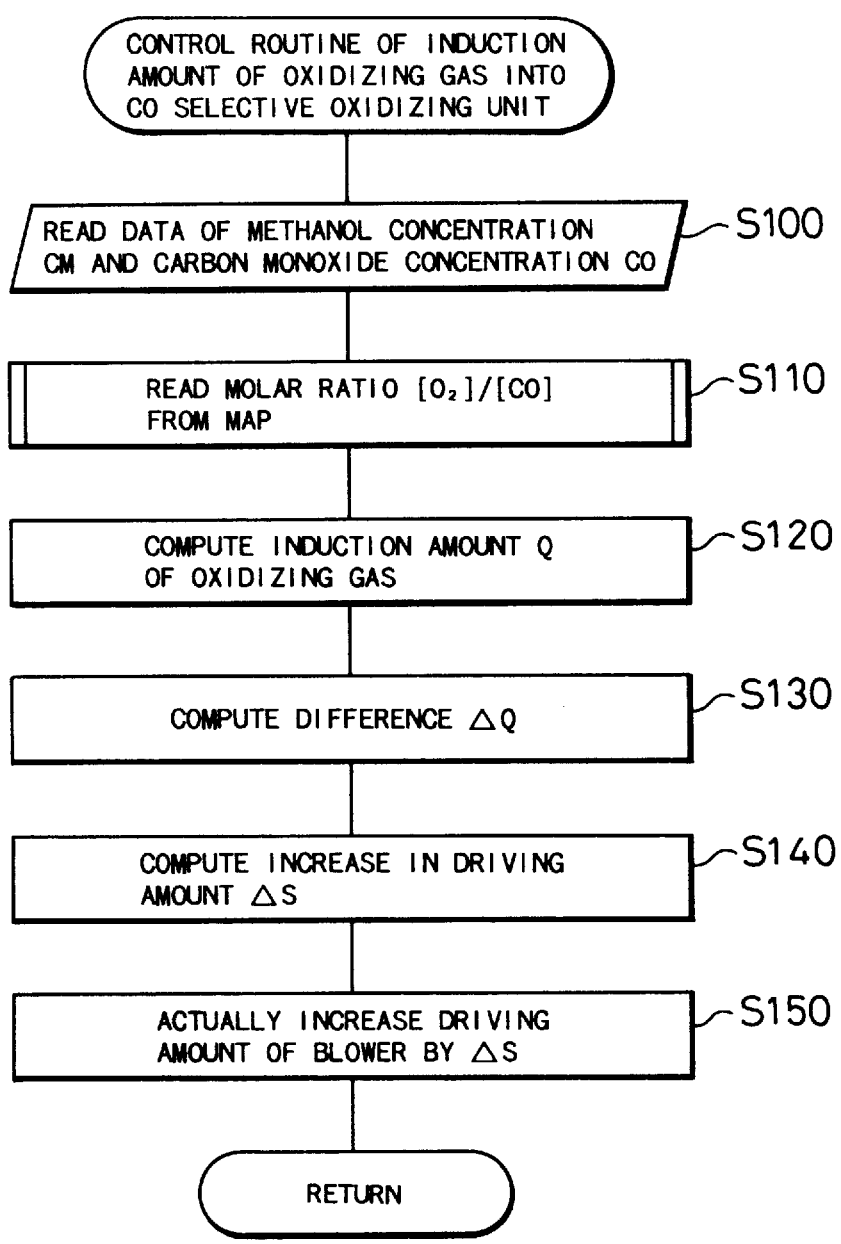
FIG. 6 is a flowchart showing a control routine of controlling the amount of oxidizing gas introduced into the CO selective oxidizing unit 34, which is executed by the electronic control unit 90 of the fuel reformer 30.

In the fuel reformer 30 of the fuel cell system 10 thus constructed, the amount of oxidizing gas introduced into the CO selective oxidizing unit 34 is controlled according to a control routine shown in the flowchart of FIG. 6. The control routine of FIG. 6 for controlling the amount of oxidizing gas introduced into the CO selective oxidizing unit 34 is executed at predetermined time intervals, for example, at every 100 msec, after the fuel reformer 30 has started its operation and fallen into a stationary state.

When the program enters the control routine of FIG. 6, the CPU 92 first receives data of methanol concentration CM and carbon monoxide concentration CO of a reformed gas in the connection conduit 36, which are measured with the concentration sensor 50, via the input/output port 98 at step S100. In accordance with a concrete procedure, the CPU 92 reads the open terminal voltage between the pair of electrodes 52 and 54, which is measured with the voltmeter 69 of the concentration sensor 50 in the OFF state of the relay 84 or OPEN position of the contact 86. The concentration of methanol corresponding to the input open terminal voltage is read from a map (not shown), which has previously been prepared and stored in the ROM 94 to represent the relationship between the methanol concentration CM and the open terminal voltage between the electrodes 52 and 54. The CPU 92 subsequently outputs a driving signal via the input/output port 98 to turn on the relay 84 and close the contact 86, thereby connecting both the terminals of the resistance 82 with the electrodes 52 and 54. The inter-terminal voltage of the resistance 82 is then measured with the voltmeter 69 in the ON state of the relay 84 or CLOSED position of the contact 86. The CPU 92 receives data of the inter-terminal voltage of the resistance 82 and determines the concentration of carbon monoxide corresponding to the input inter-terminal voltage by referring to a map (not shown), which has previously been prepared and stored in the ROM 94 to represent the relationship between the carbon monoxide concentration CO and the inter-terminal voltage of the resistance 82.

Figure 7:
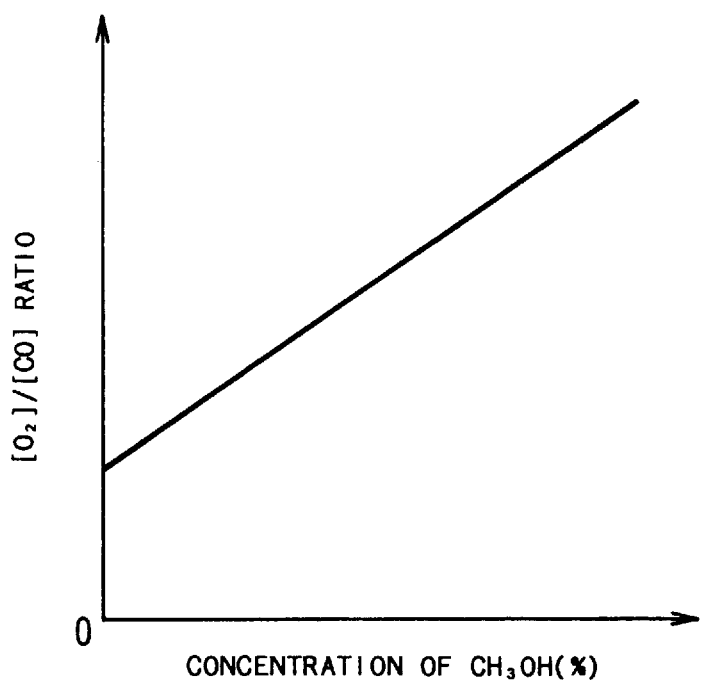
FIG. 7 is a graph showing the relationship between the methanol concentration CM and the molar ratio $[O_2]/[CO]$.
Figure 8:
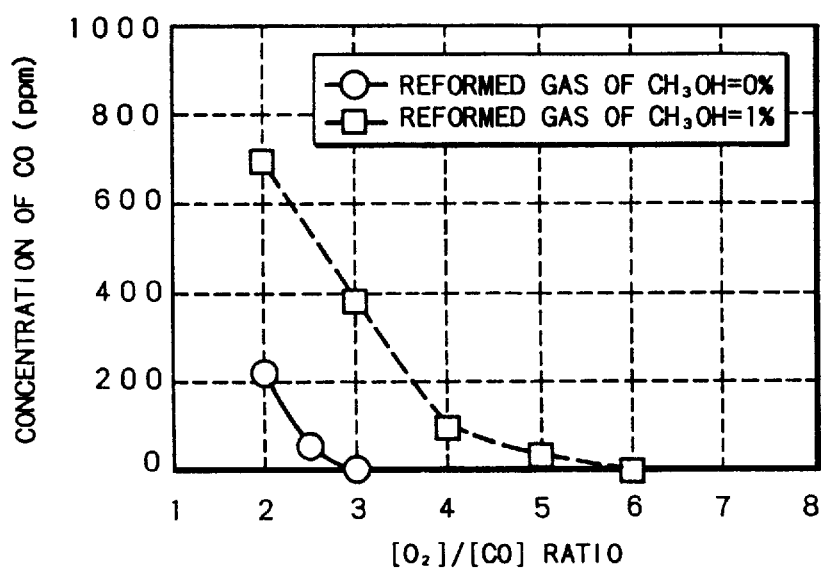
FIG. 8 is a graph, wherein the carbon monoxide concentration CO is plotted against the molar ratio $[O_2]/[CO]$ for two reformed gases with different methanol concentrations CM.

At step S110, the molar ratio of oxygen to carbon monoxide $[O_2]/[CO]$ corresponding to the input methanol concentration CM is read from a map representing the relationship between the methanol concentration CM and the molar ratio $[O_2]/[CO]$ as shown in the graph of FIG. 7. The molar ratio of oxygen to carbon monoxide $[O_2]/[CO]$ is used to determine the amount of oxidizing gas introduced into the CO selective oxidizing unit 34. In the graph of FIG. 8, the carbon monoxide concentration CO is plotted against the molar ratio $[O_2]/[CO]$ for two reformed gases with different methanol concentrations CM. As clearly seen in FIG. 8, the higher methanol concentration CM in the reformed gas requires the greater molar ratio $[O_2]/[CO]$. Otherwise the higher methanol concentration CM increases the carbon monoxide concentration CO in the gaseous fuel output from the CO selective oxidizing unit 34, thereby poisoning the platinum catalyst in the stack of fuel cells 20. The excessive molar ratio $[O_2]/[CO]$ ensures the reduction of carbon monoxide concentration CO in the gaseous fuel produced by the CO selective oxidizing unit 34, but causes hydrogen to be subjected to combustion and wastefully consumed due to the supply of excess oxygen. It is thus required to determine the amount of oxidizing gas introduced into the CO selective oxidizing unit 34, which makes the carbon monoxide concentration CO equal to or less than an allowable concentration level of the stack of fuel cells 20 and minimizes the consumption of hydrogen. The map of FIG. 7 represents the relationship between the methanol concentration CM and the molar ratio $[O_2]/[CO]$ experimentally obtained and is used to select an appropriate molar ratio $[O_2]/[CO]$. The map representing the relationship between the methanol concentration CM and the molar ratio $[O_2]/[CO]$ should be set individually depending upon the composition ratio of the platinum-ruthenium alloy catalyst charged into the CO selective oxidizing unit 34 and the gas flow per unit volume of catalyst introduced into the CO selective oxidizing unit 34. The map is thus not restricted to the proportional plane curve shown in the graph of FIG. 7.

At step S120, the CPU 92 calculates an induction amount Q of oxidizing gas introduced into the CO selective oxidizing unit 34, based on the molar ratio $[O_2]/[CO]$ thus determined and the input carbon monoxide concentration CO in the reformed gas. The program then proceeds to step S130 to calculate a difference ΔQ between current data of induction amount Q of oxidizing gas obtained in the current cycle and previous data of induction amount Q of oxidizing gas obtained in the previous cycle of this routine. An increase in driving amount ΔS of the blower 38 is determined at step S140 in order to increase the oxidizing gas introduced into the CO selective oxidizing unit 34 by the difference ΔQ. The CPU 92 outputs a driving signal to the blower 38 via the input/output port 98 to actually increase the driving amount of the blower 38 based on the data of increase in driving amount ΔS at step S150. This process enables the CO selective oxidizing unit 34 to oxidize carbon monoxide in the reformed gas preferentially over hydrogen, so that a gaseous fuel having extremely low concentration of carbon monoxide is supplied to the stack of fuel cells 20.

In the fuel reformer 30 incorporated in the fuel cell system 10 of the first embodiment, even when the reformed gas produced by the reformer unit 32 is contaminated with methanol, the platinum-ruthenium alloy catalyst charged in the CO selective oxidizing unit 34 significantly reduces the concentration of carbon monoxide in the reformed gas, compared with the ruthenium catalyst of reference charged in the CO selective oxidizing unit 34.

The amount of oxidizing gas introduced into the CO selective oxidizing unit 34 is controlled according to the concentrations of methanol and carbon monoxide in the reformed gas measured with the concentration sensor 50. This ensures the effective reduction of concentration of carbon monoxide in the reformed gas and prevents hydrogen from being subjected to combustion and wastefully consumed due to the supply of excess oxidizing gas.

In the first embodiment, the gaseous fuel produced by the fuel reformer 30 is supplied to the stack of polymer electrolyte fuel cells 20. The stack of polymer electrolyte fuel cells 20 may, however, be replaced by a stack of phosphate or other fuel cells or any other hydrogen-consuming mechanisms.

In the structure of the first embodiment, the concentration sensor 50 disposed in the connection conduit 36 is used to measure the concentrations of methanol and carbon monoxide in the reformed gas. In accordance with another preferred structure, a methanol sensor for measuring the concentration of methanol in the reformed gas and a carbon monoxide sensor for measuring the concentration of carbon monoxide in the reformed gas may be arranged separately in the connection conduit 36.

In the embodiment, the CO selective oxidizing unit 34 is combined with the reformer unit 32, which reforms methanol and produces a hydrogen-rich gas. The CO selective oxidizing unit 34 reduces the concentration of carbon monoxide in any hydrogen-rich gas containing methanol and carbon monoxide. The CO selective oxidizing unit 34 may accordingly be combined with any hydrogen-rich gas supply mechanisms other than the reformer unit 32.

Figure 9:
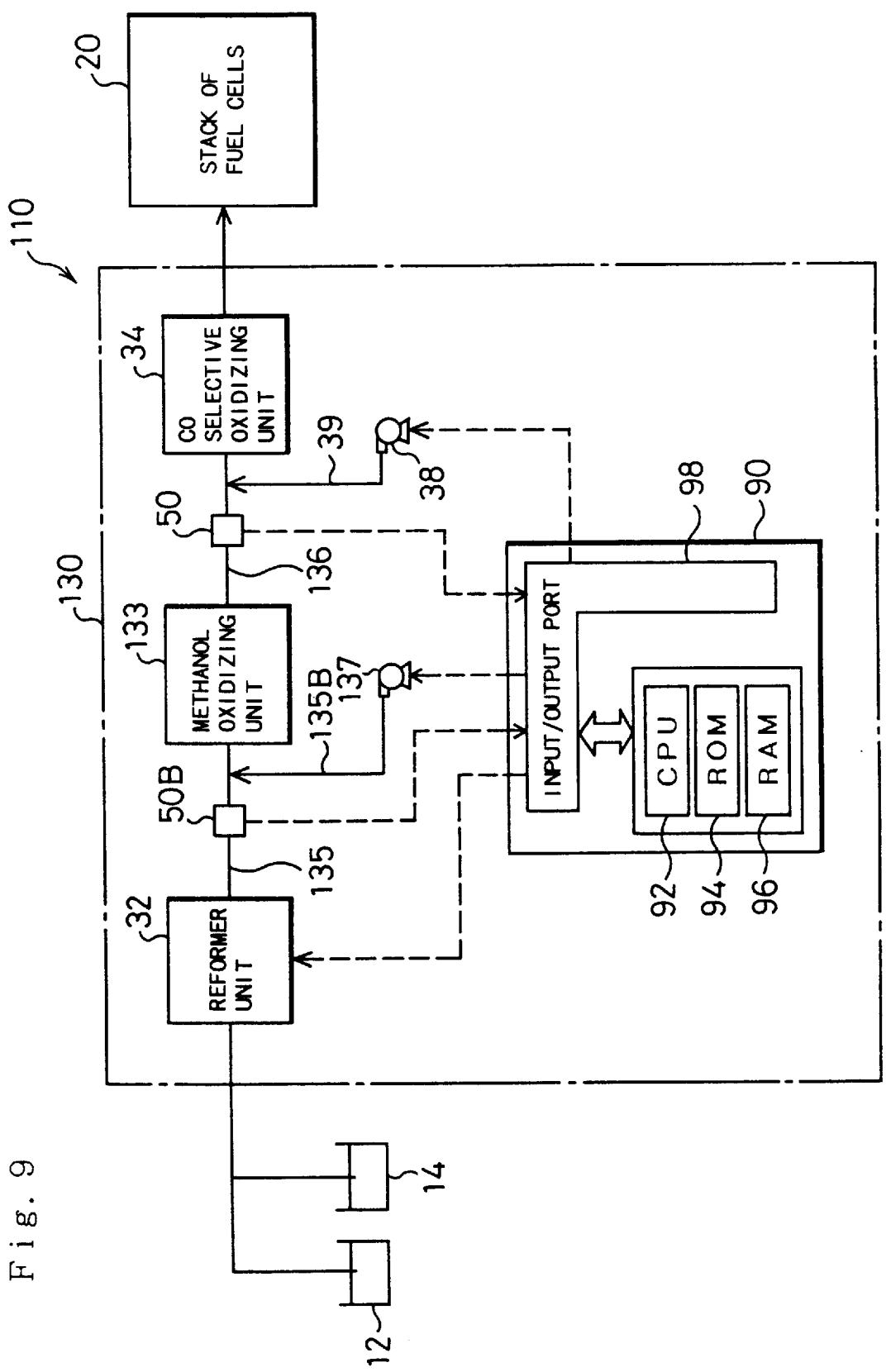
FIG. 9 is a block diagram schematically illustrating structure of another fuel cell system 110 as a second embodiment of the present invention.

Another fuel cell system 110 including a fuel reformer 130 is described as a second embodiment according to the present invention. FIG. 9 is a block diagram schematically illustrating structure of the fuel cell system 110 of the second embodiment. Referring to FIG. 9, the fuel cell system 110 includes a methanol reservoir 12 in which methanol is stored, a water reservoir 14 in which water is stored, the fuel reformer 130 for producing a hydrogen-containing gaseous fuel from methanol supplied from the methanol reservoir 12 and water supplied from the water reservoir 14, and a stack of fuel cells 20 for receiving a supply of the gaseous fuel from the fuel reformer 30 and a supply of an oxygen-containing oxidizing gas and converting the chemical energy of the gaseous fuel to electrical energy. The elements of the fuel cell system 110 of the second embodiment, which are identical with those of the fuel cell system 10 of the first embodiment, are shown by like numerals and not described here. The following describes the structure of the fuel cell system 110 of the second embodiment which is different from that of the fuel cell system 10 of the first embodiment.

The fuel reformer 130 includes a reformer unit 32 for receiving supplies of methanol and water and producing a hydrogen-rich reformed gas, a methanol oxidizing unit 133 for oxidizing methanol in the reformed gas and thereby producing a hydrogen-rich gas having lower concentration of methanol (hereinafter referred to as methanol-poor concentration-reformed gas), a CO selective oxidizing unit 34 for oxidizing carbon monoxide in the methanol-poor concentration-reformed gas and thereby producing a hydrogen-rich gaseous fuel having lower concentration of carbon monoxide, and an electronic control unit 90 for controlling operations of the respective elements of the fuel reformer 130.

The reformer unit 32 is connected to the methanol oxidizing unit 133 via a first connection conduit 135. A methanol sensor 50B for measuring concentration of methanol in the reformed gas is disposed in the first connection conduit 135. A first blower 137 introduces an oxidizing gas into the first connection conduit 135 via a first induction pipe 135B, which is connected to the first connection conduit 135 downstream the methanol sensor 50B. The methanol oxidizing unit 133 is connected to the CO selective oxidizing unit 34 via a second connection conduit 136. A concentration sensor 50 for measuring concentrations of methanol and carbon monoxide included in the methanol-poor concentration-reformed gas produced by the methanol oxidizing unit 133 is disposed in the second connection conduit 136. A second blower 38 introduces an oxidizing gas into the second connection conduit 136 via a second induction pipe 39, which is connected to the second connection conduit 136 downstream the concentration sensor 50. The methanol sensor 50B, the concentration sensor 50, and the blowers 137 and 38 are connected to the electronic control unit 90 via conductive lines.

The methanol oxidizing unit 133 receives a supply of the reformed gas produced by the reformer unit 32 and a supply of oxidizing gas, oxidizes methanol in the reformed gas preferentially over hydrogen, and thereby changes the reformed gas to a hydrogen-rich gas having lower concentration of methanol (methanol-poor concentration-reformed gas). The methanol oxidizing unit 133 thus works as the preferential oxidizing reaction unit of the apparatus for reducing concentration of methanol. The methanol oxidizing unit 133 is filled with a carrier having a ruthenium catalyst carried thereon. The concentration of methanol in the methanol-poor concentration-reformed gas produced by the methanol oxidizing unit 133 depends upon the operating temperature of the methanol oxidizing unit 133, the concentration of methanol in the reformed gas fed into the methanol oxidizing unit 133, and the flow of the reformed gas per unit volume of catalyst supplied into the methanol oxidizing unit 133. By way of example, it is assumed that the methanol oxidizing unit 133 has the volume of 1 liter and is operated at temperatures of 200° C. to 250° C., while the reformed gas given as the example in the description of the first embodiment is fed from the reformer unit 32 to the methanol oxidizing unit 133. The reformed gas is obtained at the flows of 100 ml of methanol and 100 ml of water per minute fed into the reformer unit 32 and contains approximately 1% or less amount of carbon monoxide and methanol. Under such conditions, the concentration of methanol in the methanol-poor concentration-reformed gas is not greater than 0.3%.

The ruthenium catalyst charged into the methanol oxidizing unit 133 is alumina pellets with ruthenium carried thereon, which are obtained as an intermediate in the process of the first embodiment for manufacturing the platinum-ruthenium alloy catalyst.

Figure 10:
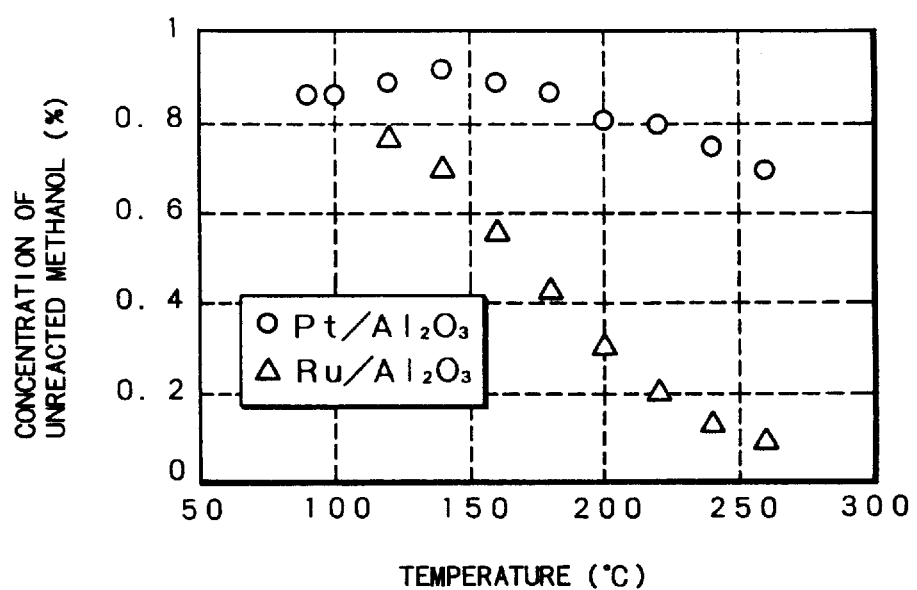
FIG. 10 is a graph showing capabilities of the ruthenium catalyst and a platinum catalyst as a reference in reducing concentration of methanol in a model gas.

FIG. 10 is a graph showing capabilities of the ruthenium catalyst and a platinum catalyst as a reference in reducing concentration of methanol in a model gas. The model gas used here is the reformed gas No. 2 having the degree of methanol conversion equal to 95% (concentration of methanol=approximately 1%) explained in the first embodiment. The model gas is mixed with an oxidizing gas to make the molar ratio of oxygen to methanol $[O_2]/[CH_3OH]$ equal to the value '1.5'. The gaseous mixture is introduced into the respective catalysts at the gas flow per unit volume of catalyst equal to approximately 5000 $h^{-1}$ on the dry gas basis. The platinum catalyst of reference is prepared by making platinum carried on aluminum pellets of 3 mm in diameter in the same manner as the above process of manufacturing the platinum-ruthenium alloy catalyst.

As clearly shown in the graph of FIG. 10, the platinum catalyst of reference does not accelerate oxidation of methanol and thereby gives no significant decrease in concentration of methanol in the gaseous mixture in any temperature range. The ruthenium catalyst, on the other hand, remarkably decreases the concentration of methanol in the gaseous mixture at temperatures of not lower than 150° C. This proves that the ruthenium catalyst can significantly lower the concentration of methanol in a hydrogen-rich gas in a range of reaction temperature between 150° C. and 300° C. or more preferably between 200° C. and 250° C.

As discussed above, since the ruthenium catalyst reduces methanol in the reformed gas in a range of reaction temperature between 150° C. and 300° C. or more preferably between 200° C. and 250° C., the temperature of the reformed gas introduced into the methanol oxidizing unit 133 is regulated adequately to allow the methanol oxidizing unit 133 to be operated in the above temperature range. In this embodiment, the reaction temperature of the reformer unit 32 is controlled to be within the range from 200° C. to 300° C., and the reformed gas generated by the reformer unit 32 accordingly has the temperature of 200° C. to 300° C. No specific temperature control is thus required for the reformed gas introduced into the methanol oxidizing unit 133.

The methanol sensor 50B has similar structure to that of the concentration sensor 50 described in the first embodiment, except that the methanol sensor 50B does not have the target-of-measurement selection mechanism 80. The voltmeter 69 accordingly measures the open terminal voltage between the pair of electrodes 52 and 54 at all times.

The following describes operation of the fuel reformer 130 incorporated in the fuel cell system 110 of the second embodiment thus constructed. The electronic control unit 90 of the fuel reformer 130 controls the amount of oxidizing gas introduced into the methanol oxidizing unit 133 and the amount of oxidizing gas introduced into the CO selective oxidizing unit 34. The amount of oxidizing gas introduced into the methanol oxidizing unit 133 is controlled according to a control routine shown in the flowchart of FIG. 11, while the amount of oxidizing gas introduced into the CO selective oxidizing unit 34 is controlled according to the control routine of FIG. 6 like the first embodiment. Details of the control procedure for the amount of oxidizing gas introduced into the CO selective oxidizing unit 34 have already been described in the first embodiment and are thus omitted here. The control routine of FIG. 11 for controlling the amount of oxidizing gas introduced into the methanol oxidizing unit 133 is executed at predetermined time intervals, for example, at every 100 msec, after the fuel reformer 130 has started its operation and fallen into a stationary state.

Figure 11:
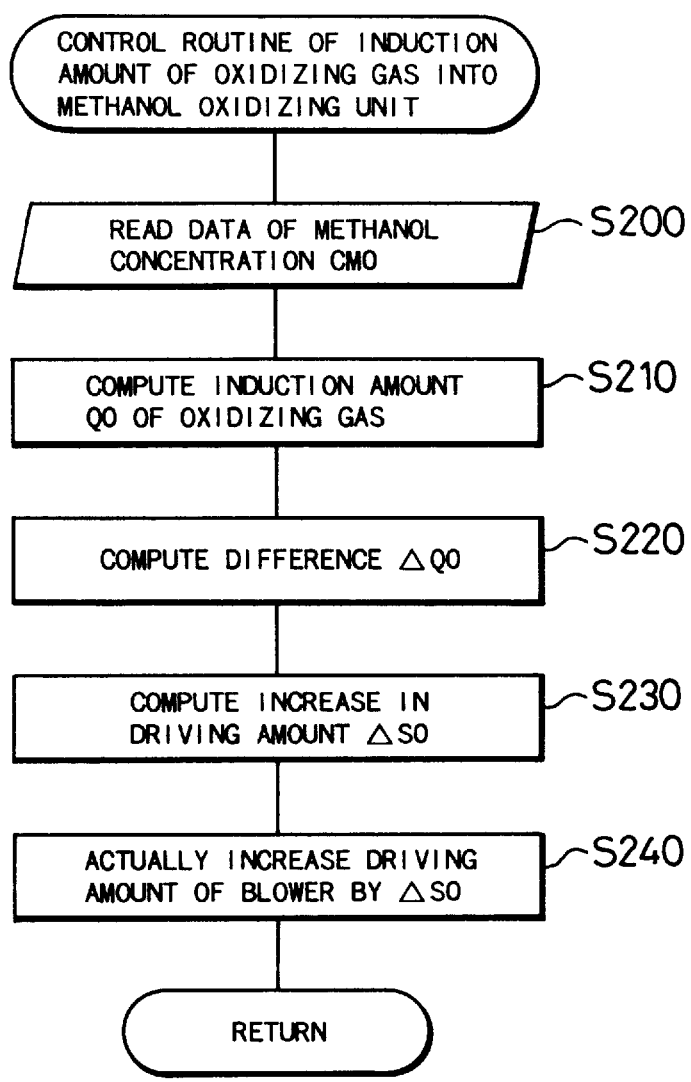
FIG. 11 is a flowchart showing a control routine of controlling the amount of oxidizing gas introduced into the methanol oxidizing unit 133, which is executed by the electronic control unit 90 of the fuel reformer 130 of the second embodiment.

When the program enters the control routine of FIG. 11, the CPU 92 first receives data of methanol concentration CM0 of a reformed gas in the first connection conduit 135, which is measured with the methanol sensor 50B, via the input/output port 98 at step S200. This is implemented by the same process as reading the methanol concentration CM measured with the concentration sensor 50 described in the first embodiment. In accordance with a concrete procedure, the CPU 92 reads the open terminal voltage between the pair of electrodes 52 and 54 measured with the voltmeter 69 of the methanol sensor 50B. The concentration of methanol corresponding to the input open terminal voltage is then read from a map (not shown), which has previously been prepared and stored in the ROM 94 to represent the relationship between the methanol concentration CM0 and the open terminal voltage between the electrodes 52 and 54.

At step S210, the CPU 92 calculates an induction amount Q0 of oxidizing gas with respect to the methanol concentration CM0 thus determined to make the molar ratio of oxygen to methanol $[O_2]/[CH_3OH]$ equal to the value '1.5'. The program then proceeds to step S220 to calculate a difference $\Delta Q0$ between current data of induction amount Q0 of oxidizing gas obtained in the current cycle and previous data of induction amount Q0 of oxidizing gas obtained in the previous cycle of this routine. An increase in driving amount $\Delta S0$ of the blower 137 is determined at step S230 in order to increase the oxidizing gas introduced into the methanol oxidizing unit 133 by the difference $\Delta Q0$. The CPU 92 outputs a driving signal to the blower 137 via the input/output port 98 to actually increase the driving amount of the blower 137 based on the data of increase in driving amount $\Delta S0$ at step S240.

This process enables the methanol oxidizing unit 133 to oxidize methanol in the reformed gas preferentially over hydrogen, so that a reformed gas having lower concentration of methanol (that is, methanol-poor concentration-reformed gas) is supplied to the CO selective oxidizing unit 34. As discussed previously in the first embodiment, the CO selective oxidizing unit 34 preferentially oxidizes carbon monoxide in the methanol-poor concentration-reformed gas, so that a gaseous fuel having extremely low concentrations of methanol and carbon monoxide is supplied to the stack of fuel cells 20.

The fuel reformer 130 incorporated in the fuel cell system 110 of the second embodiment has the methanol oxidizing unit 133 filled with the ruthenium catalyst, which efficiently reduces the concentration of methanol in the reformed gas. This leads to a significant decrease in concentration of methanol in a resulting gaseous fuel and effectively prevents methanol from interfering with the electrode reactions in the stack of fuel cells 20. The CO selective oxidizing unit 34 filled with the platinum-ruthenium alloy catalyst oxidizes carbon monoxide in the methanol-poor concentration-reformed gas preferentially over hydrogen, thus allowing the resulting gaseous fuel having significantly low concentration of carbon monoxide to be supplied to the stack of fuel cells 20.

In the second embodiment, the methanol oxidizing unit 133 is combined with the reformer unit 32, which reforms methanol and produces a hydrogen-rich gas. The methanol oxidizing unit 133 reduces the concentration of methanol in any hydrogen-rich gas containing methanol. The methanol oxidizing unit 133 may accordingly be combined with any hydrogen-rich gas supply mechanisms other than the reformer unit 32.

The structure of the second embodiment controls the induction amount of oxidizing gas introduced into the CO selective oxidizing unit 34, based on the concentrations of methanol and carbon monoxide in the methanol-poor concentration-reformed gas measured with the concentration sensor 50. In accordance with another preferred structure, the induction amount of oxidizing gas introduced into the CO selective oxidizing unit 34 may be controlled, based on only the data of carbon monoxide concentration measured with a carbon monoxide sensor, which corresponds to the structure that the contact 86 of the relay 84 in the target-of-measurement selection mechanism 80 of the concentration sensor 50 is always set in CLOSED position. In this modified structure, the concentration of methanol in the methanol-poor concentration-reformed gas output from the methanol oxidizing unit 133 is set equal to a predetermined value, for example, experimental data like 0.2%. The molar ratio of oxygen to carbon monoxide is also set to a predetermined level in advance.

In the second embodiment, the CO selective oxidizing unit 34 is filled with the platinum-ruthenium alloy catalyst. Since the methanol oxidizing unit 133 lowers the concentration of methanol in the reformed gas, the CO selective oxidizing unit 34 may be filled with the ruthenium catalyst. As clearly shown in the graph of FIG. 4, in this modification, it is preferable to set the operating temperature of the CO selective oxidizing unit 34 equal to approximately 140° C. The temperature of the methanol-poor concentration-reformed gas should accordingly be regulated to attain such temperature control.

Figure 12:
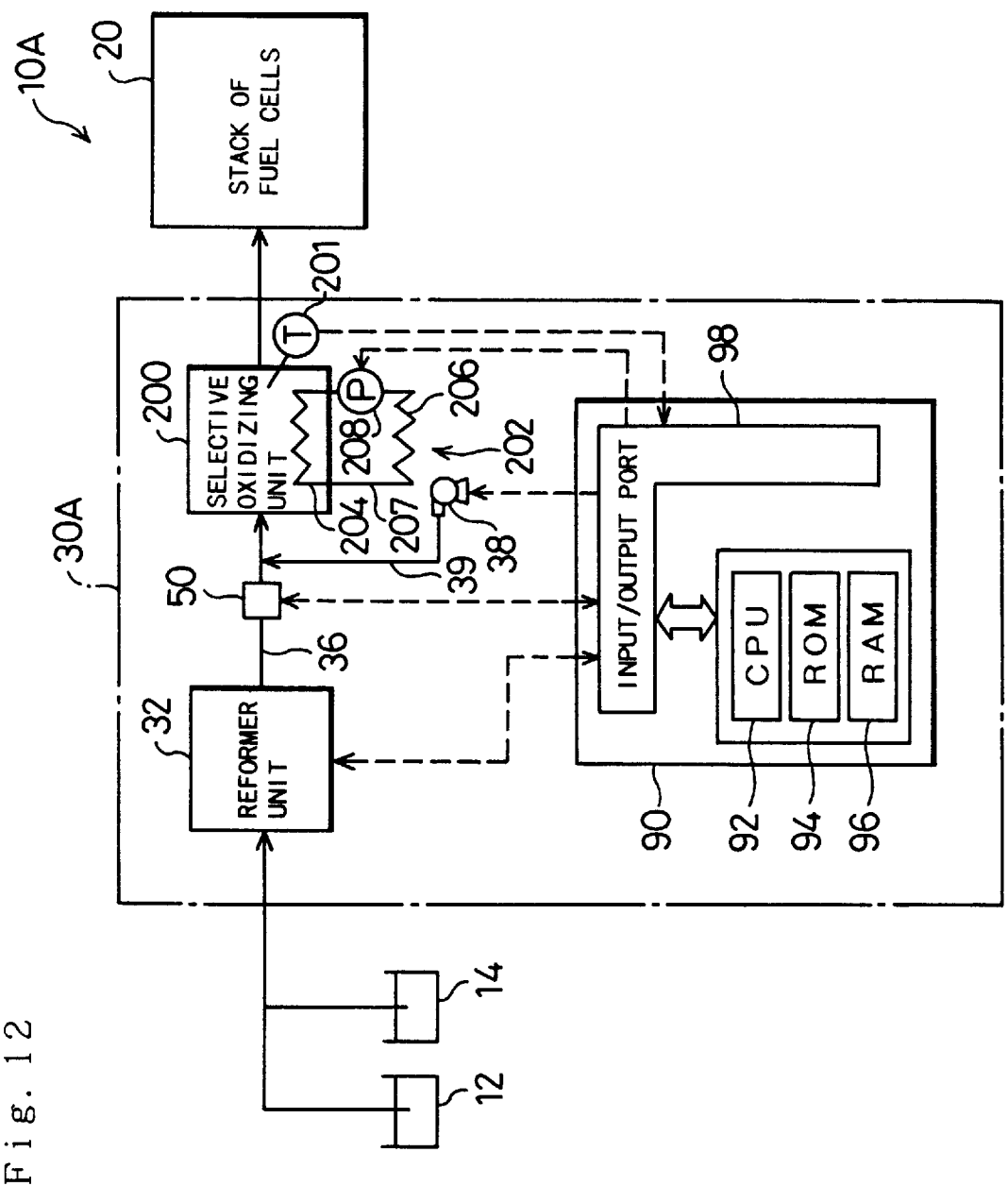
FIG. 12 is a block diagram schematically illustrating structure of still another fuel cell system 10A as a third embodiment of the present invention.

Still another fuel cell system 10A including a fuel reformer 30A is described as a third embodiment according to the present invention. FIG. 12 is a block diagram schematically illustrating structure of the fuel cell system 10A of the third embodiment. Referring to FIG. 12, the fuel cell system 10A of the third embodiment has structure similar to that of the fuel cell system 10 of the first embodiment shown in FIG. 1, except that the fuel reformer 30A includes a selective oxidizing unit 200 in place of the CO selective oxidizing unit 34 and that the selective oxidizing unit 200 is provided with a cooler 202, which is different from a cooler (not shown) of the CO selective oxidizing unit 34. The elements of the fuel cell system 10A of the third embodiment, which are identical with those of the fuel cell system 10 of the first embodiment, are shown by like numerals and not described here. Like symbols denote like meanings unless otherwise specified.

Figure 13:
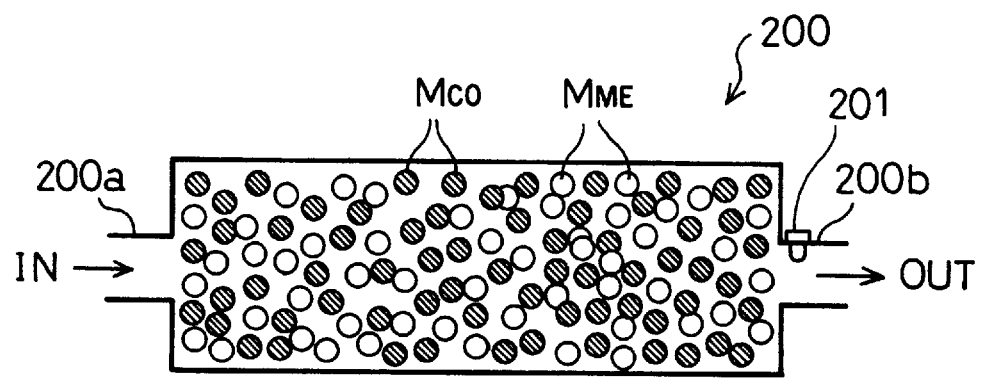
FIG. 13 is a schematic diagram showing an internal state of the selective oxidizing unit 200 incorporated in the fuel reformer 30A of the third embodiment.

FIG. 13 is a schematic diagram showing an internal state of the selective oxidizing unit 200 incorporated in the fuel reformer 30A of the third embodiment. The selective oxidizing unit 200 is filled with a 1 to 1 mixture of a CO-oxidizing catalyst MCO for accelerating oxidation of carbon monoxide in a reformed gas produced by the reformer unit 32 preferentially over hydrogen and a methanol-oxidizing catalyst MME for accelerating oxidation of methanol in the reformed gas preferentially over hydrogen. The 1:1 mixture of catalysts MCO and MME is arranged homogeneously in the whole selective oxidizing unit 200. The CO-oxidizing catalyst MCO is the platinum-ruthenium alloy catalyst prepared by making an alloy of platinum and ruthenium as a catalyst carried on aluminum pellets of 3 mm in diameter as described in the first embodiment. The methanol-oxidizing catalyst MME is the ruthenium catalyst prepared by making ruthenium as a catalyst carried on aluminum pellets of 3 mm in diameter as described in the second embodiment.

The active temperature of the CO-oxidizing catalyst MCO ranges from 80° C. to 200° C. or more preferably from 80° C. to 100° C. for the reformed gas having the methanol concentration CM of approximately 1%. As for the reformed gas having the methanol concentration CM of less than 0.1%, however, the active temperature of the CO-oxidizing catalyst MCO ranges from 50° C. to 250° C. or more preferably 80° C. to 200° C. The active temperature of the methanol-oxidizing catalyst MME ranges from 150° C. to 300° C. or more preferably from 200° C. to 250° C. as long as the carbon monoxide concentration CO is less than 2 or 3%.

The selective oxidizing unit 200 is further provided with a temperature sensor 201 for detecting temperature in the vicinity of an outlet 200b of reformed gas. The temperature sensor 201 is connected to the electronic control unit 90 via a conductive line.

Referring to FIG. 12, the cooler 202 includes a first heat exchanger 204 for exchanging heat with the selective oxidizing unit 200, a second heat exchanger 206 for exchanging heat with the atmosphere, a circulation conduit 207 for connecting the first heat exchanger 204 with the second heat exchanger 206 and defining a circulation path of a cooling medium, such as water or oil, and a circulation pump 208 disposed in the circulation conduit 207 for circulating the cooling medium. The circulation pump 208 is connected to the electronic control unit 90 via a conductive line and driven and controlled by the electronic control unit 90.

Figure 14:
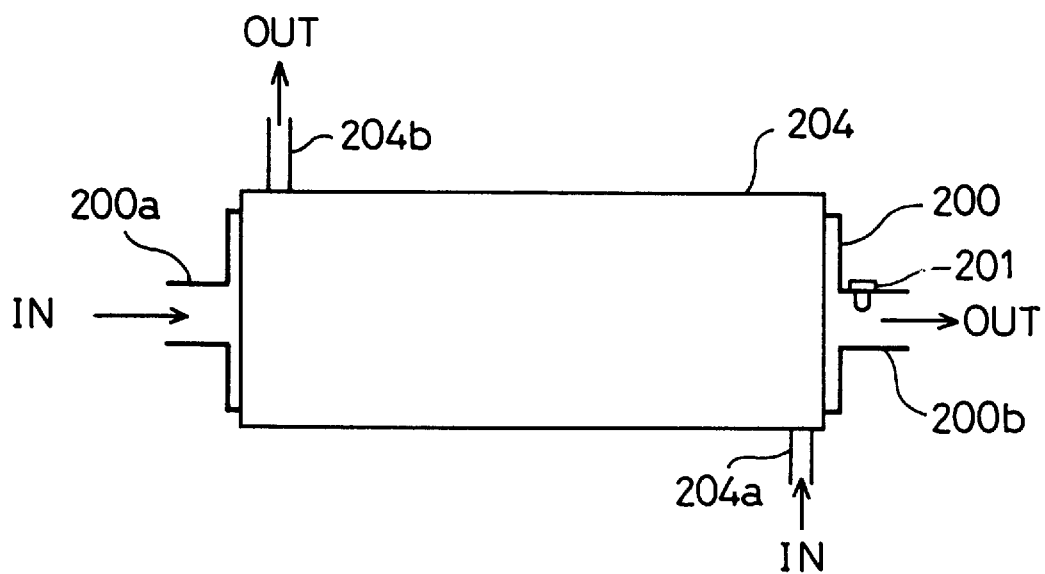
FIG. 14 shows a process of cooling the selective oxidizing unit 200 by means of a first heat exchanger 204.

FIG. 14 shows a process of cooling the selective oxidizing unit 200 by means of the first heat exchanger 204.

The first heat exchanger 204 is attached to the selective oxidizing unit 200 in the manner that an inlet 204a of cooling medium in the first heat exchanger 204 is arranged close to the outlet 200b of reformed gas in the selective oxidizing unit 200 while an outlet 204b of cooling medium being close to an inlet 200a of reformed gas in the selective oxidizing unit 200. This enables a flow of cooling medium to be in the reverse of the flow of reformed gas in the selective oxidizing unit 200. The temperature of the selective oxidizing unit 200 accordingly reaches its minimum in the vicinity of the outlet 200b of reformed gas and gradually increases towards the inlet 200a of reformed gas.

The selective oxidizing unit 200 has a temperature gradient in the direction of flow of reformed gas. The temperature gradient depends upon the temperature and flow rate of reformed gas introduced into the selective oxidizing unit 200, the area of cross section perpendicular to the direction of flow of the reformed gas in the selective oxidizing unit 200, the length of the selective oxidizing unit 200 in the direction of flow, and the temperature and flow rate of cooling medium supplied to the first heat exchanger 204. In the structure of the third embodiment, the selective oxidizing unit 200 and the first heat exchanger 204 are controlled to linearly decrease the temperature of a reformed gas in the direction of flow passing through the selective oxidizing unit 200. By way of example, the reformed gas having a temperature of 260° C. when supplied into the selective oxidizing unit 200 is cooled down to 80° C. when flowing out of the selective oxidizing unit 200. The circulation pump 208 is applied to regulate the flow rate of cooling medium. The reformed gas of 200° C. through 320° C. when supplied into the selective oxidizing unit 200 can thus be cooled to the temperature range of 60° C. to 130° C. when flowing out of the selective oxidizing unit 200. The temperature of the reformed gas should be controlled to approximately 80° C. in the vicinity of the outlet 200b of the selective oxidizing unit 200. This is because that the preferable operating temperature of the stack of fuel cells 20 to realize a high efficiency of power generation ranges from 60° C. to 120° C. when a Naphion membrane (manufactured by du Pont) is used for the electrolyte membrane 21 in the stack of fuel cells 20. The circulation pump 208 is feedback controlled by the electronic control unit 90 to make the temperature of the reformed gas in the vicinity of the outlet 200b of the selective oxidizing unit 200 approach a preset target temperature. The temperature of the reformed gas is measured with the temperature sensor 201 arranged in the vicinity of the outlet 200b of reformed gas in the selective oxidizing unit 200.

Figure 15:
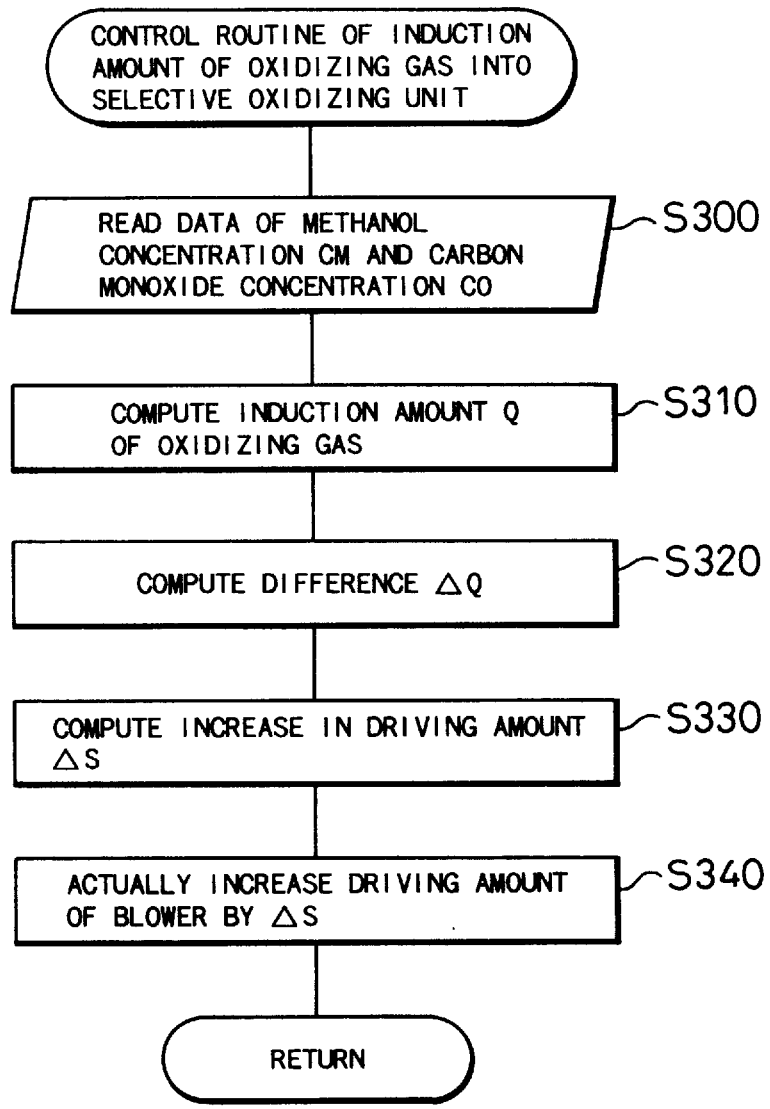
FIG. 15 is a flowchart showing a control routine of controlling the amount of oxidizing gas introduced into the selective oxidizing unit 200, which is executed by the electronic control unit 90 of the fuel reformer 30A of the third embodiment.

The induction amount of oxidizing gas introduced into the selective oxidizing unit 200 of the fuel reformer 30A incorporated in the fuel cell system 10A of the third embodiment is controlled according to a control routine shown in the flowchart of FIG. 15. The control routine of FIG. 15 for controlling the amount of oxidizing gas introduced into the selective oxidizing unit 200 is executed at predetermined time intervals, for example, at every 100 msec, after the fuel reformer 30A has started its operation and fallen into a stationary state.

When the program enters the control routine of FIG. 15, the CPU 92 first receives data of methanol concentration CM and carbon monoxide concentration CO of a reformed gas in the connection conduit 36, which are measured with the concentration sensor 50, via the input/output port 98 at step S300. The procedure of determining the methanol concentration CM and the carbon monoxide concentration CO with the concentration sensor 50 has been described previously. At step S310, the CPU 92 calculates an induction amount Q of oxidizing gas introduced into the selective oxidizing unit 200, based on the methanol concentration CM and the carbon monoxide concentration CO thus determined. In accordance with a concrete procedure, the amount of oxygen required for oxidizing methanol is calculated from the input methanol concentration CM and the molar ratio of oxygen to methanol $[O_2]/[CH_3OH]=1.5$, which is the value for completely oxidizing methanol. The amount of oxygen required for oxidizing carbon monoxide is calculated from the input carbon monoxide concentration CO and the molar ratio of oxygen to carbon monoxide $[O_2]/[CO]=0.5$, which is the value for completely oxidizing carbon monoxide. The total induction amount Q of oxidizing gas is obtained by summing the required amounts of oxygen and converting the total amount of oxygen to the oxidizing gas basis. The molar ratio of oxygen to methanol $[O_2]/[CH_3OH]$ =1.5 and the molar ratio of oxygen to carbon monoxide $[O_2]/[CO]$=0.5 are theoretical values. In the actual control procedure, little greater values are set to the respective molar ratios in order to ensure significant decreases in methanol concentration CM and carbon monoxide concentration CO in the reformed gas.

After computing the induction amount Q of oxidizing gas at step S310, the program proceeds to step S320 to calculate a difference ΔQ between current data of induction amount Q of oxidizing gas obtained in the current cycle and previous data of induction amount Q of oxidizing gas obtained in the previous cycle of this routine. An increase in driving amount ΔS of the blower 38 is determined at step S330 in order to increase the oxidizing gas introduced into the selective oxidizing unit 200 by the difference ΔQ. The CPU 92 outputs a driving signal to the blower 38 via the input/output port 98 to actually increase the driving amount of the blower 38 based on the data of increase in driving amount ΔS at step S340. This process enables the selective oxidizing unit 200 to oxidize methanol and carbon monoxide in the reformed gas preferentially over hydrogen, so that a gaseous fuel having extremely low methanol concentration CM and carbon monoxide concentration CO is supplied to the stack of fuel cells 20.

Figure 16:
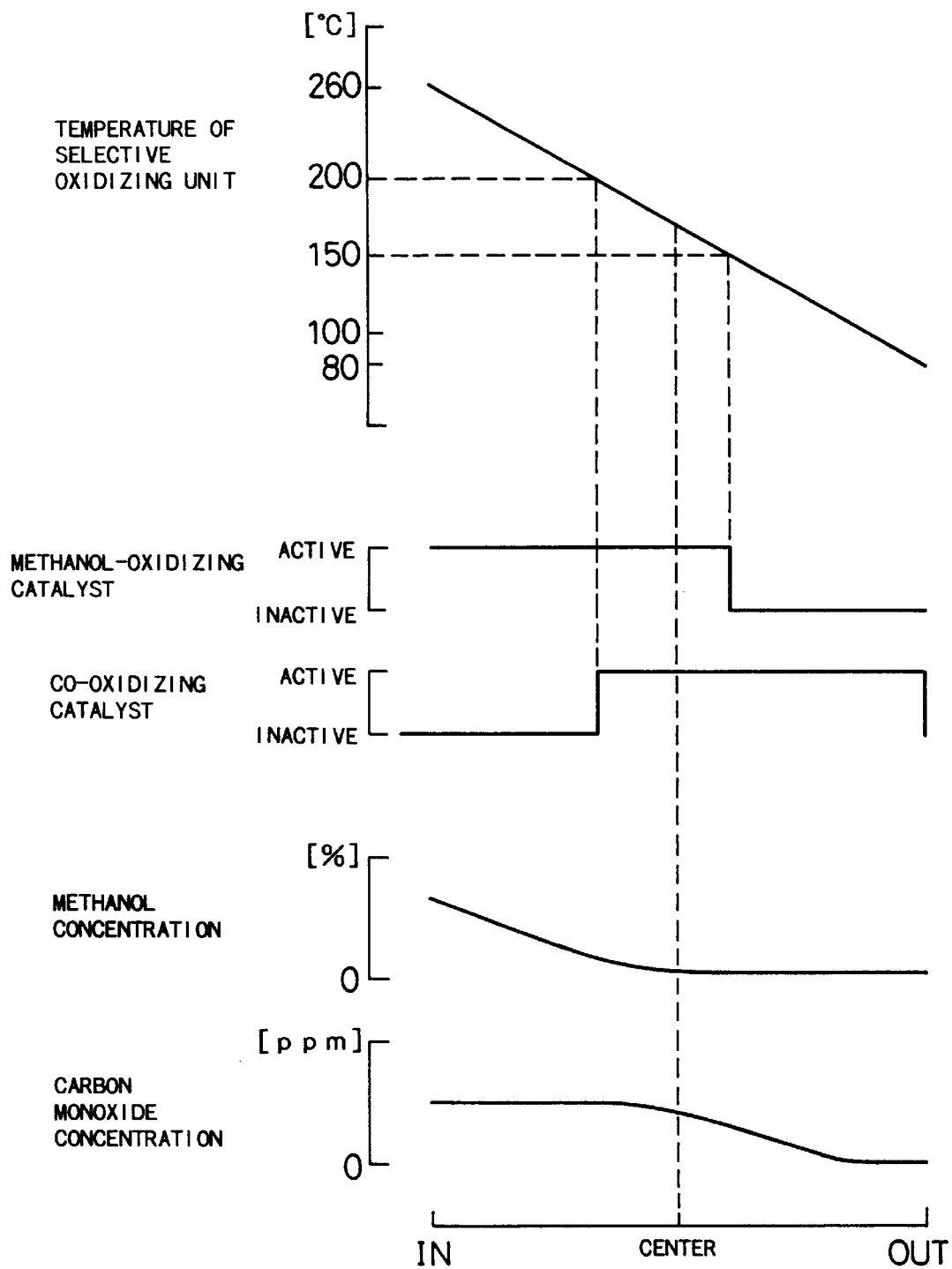
FIG. 16 shows operation of the selective oxidizing unit 200 for reducing the methanol concentration CM and the carbon monoxide concentration CO in the reformed gas.

FIG. 16 shows operation of the selective oxidizing unit 200 for reducing the methanol concentration CM and the carbon monoxide concentration CO in the reformed gas. In the graph of FIG. 16, the internal temperature of the selective oxidizing unit 200, the active state of the methanol-oxidizing catalyst MME and the CO-oxidizing catalyst MCO, and the methanol concentration CM and the carbon monoxide concentration CO in the reformed gas are plotted against the flow of reformed gas in the selective oxidizing unit 200. In this measurement, the selective oxidizing unit 200 and the first heat exchanger 204 are controlled to linearly decrease the temperature of a reformed gas, which is 260° C. when supplied into the selective oxidizing unit 200, in the direction of flow passing through the selective oxidizing unit 200, to 80° C. when flowing out of the selective oxidizing unit 200.

As discussed above, the active temperature of the methanol-oxidizing catalyst MME ranges from 150° C. to 300° C. Among the methanol-oxidizing catalyst MME charged in the selective oxidizing unit 200, the catalyst existing in the length of approximately ⅔ from the inlet 200a of reformed gas in the selective oxidizing unit 200 is thus activated to accelerate oxidation of methanol in the reformed gas preferentially over hydrogen. The methanol concentration CM of the reformed gas accordingly starts decreasing in the vicinity of the inlet 200a of reformed gas in the selective oxidizing unit 200 and is reduced to approximately 0.1% or a lower level in the substantial center of the selective oxidizing unit 200. The active temperature of the CO-oxidizing catalyst MCO, on the other hand, ranges from 80° C. to 200° C. Among the CO-oxidizing catalyst MCO charged in the selective oxidizing unit 200, the catalyst existing after the length of approximately ⅓ from the inlet 200a of reformed gas in the selective oxidizing unit 200 is thus activated to accelerate oxidation of carbon monoxide in the reformed gas preferentially over hydrogen. The carbon monoxide concentration CO of the reformed gas accordingly starts decreasing after the length of approximately ⅓ from the inlet 200a of reformed gas in the selective oxidizing unit 200 and is reduced to several ppm or a lower level in the vicinity of the outlet 200b of reformed gas in the selective oxidizing unit 200.

As discussed above, the fuel reformer 30A incorporated in the fuel cell system 10A of the third embodiment has the selective oxidizing unit 200, which is filled with the methanol-oxidizing catalyst MME and the CO-oxidizing catalyst MCO and accordingly attains a significant decrease in concentrations of methanol and carbon monoxide in the reformed gas. This leads to a significant decrease in concentrations of methanol and carbon monoxide in a resulting gaseous fuel and effectively prevents methanol and carbon monoxide from interfering with the electrode reactions in the stack of fuel cells 20.

The selective oxidizing unit 200 is filled with the methanol-oxidizing catalyst MME and the CO-oxidizing catalyst MCO, which are mixed homogeneously at the ratio of 1 to 1. This allows the selective oxidizing unit 200 to be easily manufactured.

The amount of oxidizing gas introduced into the selective oxidizing unit 200 is controlled according to the concentrations of methanol and carbon monoxide in the reformed gas measured with the concentration sensor 50. This ensures the effective reduction of concentrations of methanol and carbon monoxide in the reformed gas and prevents hydrogen from being subjected to combustion and wastefully consumed due to the supply of excess oxidizing gas.

In the fuel cell system 10A of the third embodiment, the platinum-ruthenium alloy catalyst is used for the CO-oxidizing catalyst MCO charged in the selective oxidizing unit 200. Any catalyst which can accelerate oxidation of carbon monoxide in a hydrogen-rich gas preferentially over hydrogen may, however, be applied to the CO-oxidizing catalyst MCO. Possible examples include platinum, ruthenium, palladium, and rhodium catalysts as well as alloy catalysts including any of these metals. When the ruthenium catalyst is used for both the CO-oxidizing catalyst MCO and the methanol-oxidizing catalyst MME, no adjustment is required for mixing the methanol-oxidizing catalyst MME with the CO-oxidizing catalyst MCO. This further simplifies the process of manufacturing the selective oxidizing unit 200.

In the fuel cell system 10A of the third embodiment, the first heat exchanger 204 of the cooler 202 is arranged to attain a linear temperature gradient in the selective oxidizing unit 200. In accordance with another preferred structure, the first heat exchanger 204 may be arranged to make the temperature of the selective oxidizing unit 200 substantially constant in the direction of flow of reformed gas. In this modified structure, the selective oxidizing unit 200 should be controlled to a specific temperature range for simultaneously activating the methanol-oxidizing catalyst MME and the CO-oxidizing catalyst MCO. By way of example, it is assumed that the ruthenium catalyst is used for the methanol-oxidizing catalyst MME and the platinum-ruthenium alloy catalyst is for the CO-oxidizing catalyst MCO. Since both the catalysts are activated in the temperature range of 150° C. to 200° C. as shown in the graph of FIG. 16, the selective oxidizing unit 200 should be controlled to this temperature range. In this case, the temperature of the gaseous fuel supplied to the stack of fuel cells 20 should be controlled to an applicable range of the electrolyte membrane 21 in the stack of fuel cells 20. The temperature of gaseous fuel should be regulated to the range of 60° C. to 120° C., for example, when a Naphion membrane (manufactured by du Pont) is used for the electrolyte membrane 21. Another heat exchanger should be arranged after the selective oxidizing unit 200.

Figure 17:
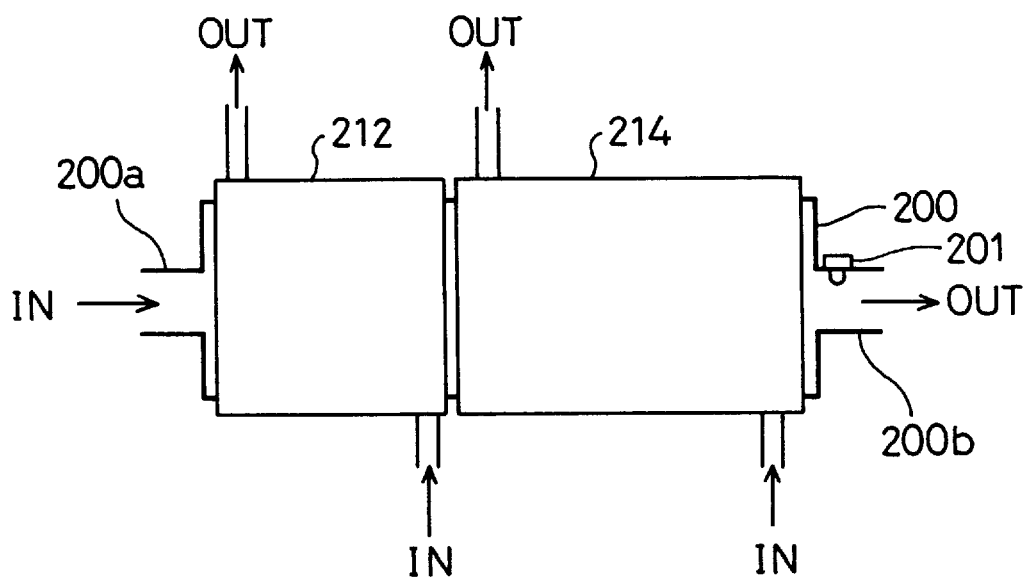
FIG. 17 shows a modification of the first heat exchanger 204 of the third embodiment.

In the fuel cell system 10A of the third embodiment, the first heat exchanger 204 of the cooler 202 is arranged to make the flow of cooling medium in the first heat exchanger 204 in the reverse of the flow of reformed gas in the selective oxidizing unit 200. As shown in a modified structure of FIG. 17, heat exchangers 212 and 214 may be attached respectively to the portion of inlet 200a and the portion of outlet 200b in the selective oxidizing unit 200. In this case, the heat exchanger 212 is controlled to be in a range of active temperature of the methanol-oxidizing catalyst MME, while the heat exchanger 214 is controlled to be in a range of active temperature of the CO-oxidizing catalyst MCO.

Figure 18:
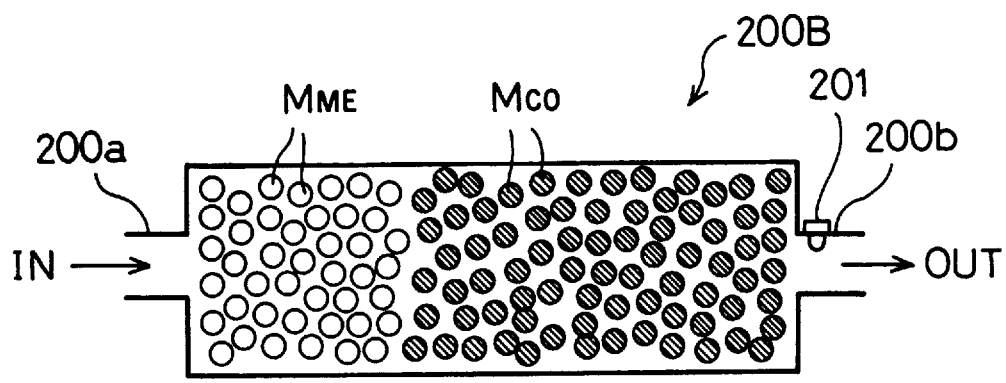
FIG. 18 is a schematic view illustrating an internal state of a selective oxidizing unit 200B as a first modification of the selective oxidizing unit 200 of the third embodiment.

In the fuel cell system 10A of the third embodiment, the 1:1 mixture of methanol-oxidizing catalyst MME and CO-oxidizing catalyst MCO is homogeneously charged into the selective oxidizing unit 200. The mixing ratio of the methanol-oxidizing catalyst MME to the CO-oxidizing catalyst MCO is not restricted to 1 to 1, but may be varied, for example, between 1 to 10 and 10 to 1. As illustrated in another selective oxidizing unit 200B of FIG. 18, which is a first modified example of the selective oxidizing unit 200, the methanol-oxidizing catalyst MME may be charged into the portion of inlet 200a in the selective oxidizing unit 200B, separately from the CO-oxidizing catalyst MCO which is packed into the portion of outlet 200b. In this modified structure, the first stage of the selective oxidizing unit 200B efficiently reduces the methanol concentration CM of the reformed gas, and the second stage efficiently reduces the carbon monoxide concentration CO of the reformed gas.

Figure 19:
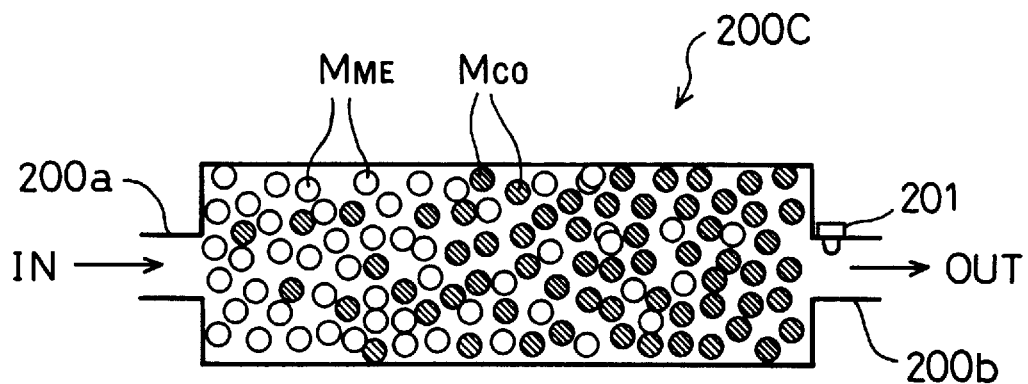
FIG. 19 is a schematic view illustrating an internal state of another selective oxidizing unit 200C as a second modification of the selective oxidizing unit 200 of the third embodiment.

As illustrated in still another selective oxidizing unit 200C of FIG. 19, which is a second modified example of the selective oxidizing unit 200, the mixing ratio of the methanol-oxidizing catalyst MME to the CO-oxidizing catalyst MCO may be decreased from the inlet 200a to the outlet 200b of the selective oxidizing unit 200C. In this case, the mixing ratio of the methanol-oxidizing catalyst MME o the CO-oxidizing catalyst MCO may be varied gradually or stepwise like 1 to 0, 2 to 1, 1 to 1, 1 to 2, and 0 to 1 from the inlet 200a of the selective oxidizing unit 200C. As illustrated in still another selective oxidizing unit 200D of FIG. 20, which is a third modified example of the selective oxidizing unit 200, another carrier, such as honeycomb tubes coated with alumina, may be used for the catalyst carrier, instead of alumina pellets used in the selective oxidizing unit 200. In this modified structure, a honeycomb HME with a methanol-oxidizing catalyst carried thereon is arranged at the side of inlet 200a of the selective oxidizing unit 200D, whereas a honeycomb HCO with a CO-oxidizing catalyst carried thereon is arranged at the side of outlet 200b of the selective oxidizing unit 200D.

As discussed above, in the fuel cell system 10A of the third embodiment, the 1:1 mixture of methanol-oxidizing catalyst MME and CO-oxidizing catalyst MCO is homogeneously charged into the selective oxidizing unit 200. As illustrated in still another selective oxidizing unit 200E of FIG. 21, which is cooled by the surrounding first heat exchanger 204, the methanol-oxidizing catalyst MME may be arranged on the central portion of the selective oxidizing unit 200E whereas the CO-oxidizing catalyst MCO may be arranged on the circumferential portion of the selective oxidizing unit 200E. Since the first heat exchanger 204 covering over the selective oxidizing unit 200E cools the selective oxidizing unit 200E, the circumferential portion of the selective oxidizing unit 200E has lower temperatures than those of the central portion. The circumferential portion is accordingly set in the range of active temperature of the CO-oxidizing catalyst MCO, while the central portion is set in the range of active temperature of the methanol-oxidizing catalyst MME. In order to enable both the methanol-oxidizing catalyst MME and the CO-oxidizing catalyst MCO to be exposed to the reformed gas, it is preferable to arrange gas diffusion plates or baffle plates for making a deflected flow of reformed gas on a plurality of positions in the selective oxidizing unit 200E. The gas diffusion plates are preferably composed of non-woven fabric of glass fibers or carbon fibers or porous material, such as foamed metals, foamed ceramics, or porous carbons. This structure enables the methanol-oxidizing catalyst MME and the CO-oxidizing catalyst MCO to be respectively controlled to the adequate temperature ranges in the selective oxidizing unit 200E. This structure also attains the simple temperature control of the whole selective oxidizing unit 200E. In another structure that heat exchange is implemented through a flow path of a cooling medium of the first heat exchanger 204 which is arranged inside the selective oxidizing unit 200, the CO-oxidizing catalyst MCO is arranged in the vicinity of the flow path of the cooling medium whereas the methanol-oxidizing catalyst MME is arranged apart from the flow path of the cooling medium.

Figure 20:
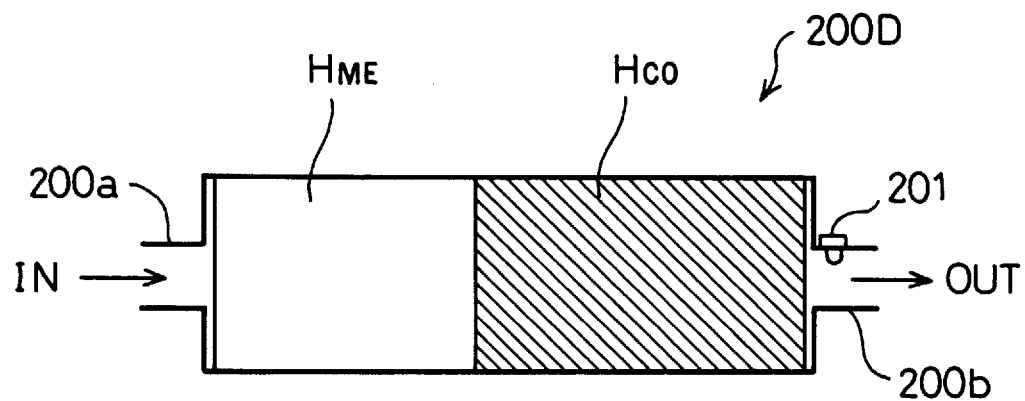
FIG. 20 is a schematic view illustrating an internal state of still another selective oxidizing unit 200D as a third modification of the selective oxidizing unit 200 of the third embodiment.
Figure 22:
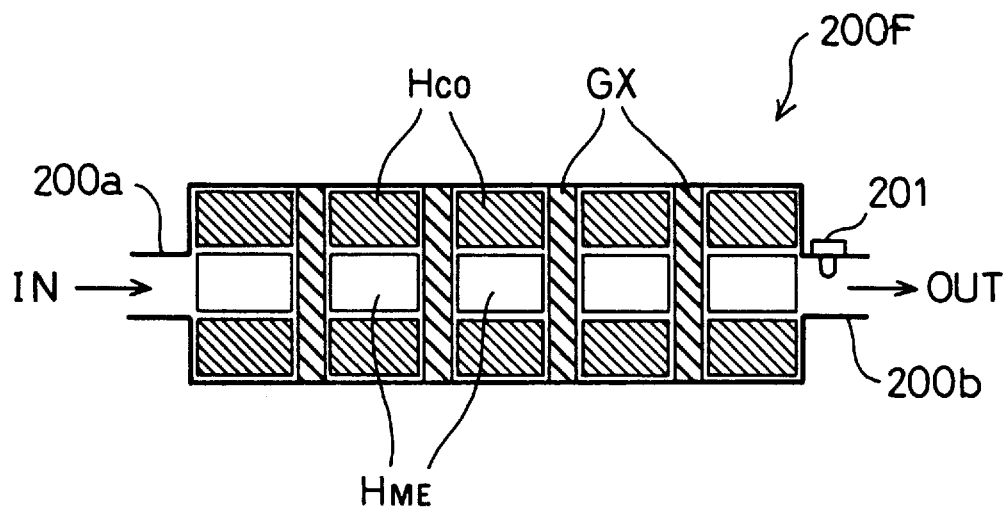
FIG. 22 is a schematic view illustrating an internal state of another selective oxidizing unit 200F as a fifth modification of the selective oxidizing unit 200 of the third embodiment.

Even in this type of selective oxidizing unit 200, where the CO-oxidizing catalyst MCO is arranged near the flow path of the cooling medium and the methanol-oxidizing catalyst MME apart from the flow path of the cooling medium, the honeycomb tubes coated with alumina may be used for the catalyst carrier as described in the modified selective oxidizing unit 200D of FIG. 20. As illustrated in another selective oxidizing unit 200F of FIG. 22, honeycombs HCO with a CO-oxidizing catalyst carried thereon are arranged on the circumferential portion of the selective oxidizing unit 200F whereas honeycombs HME with a methanol-oxidizing catalyst carried thereon are arranged on the central portion of the selective oxidizing unit 200F. In order to enable both the honeycombs HCO with a CO-oxidizing catalyst carried thereon and honeycombs HME with a methanol-oxidizing catalyst carried thereon to be exposed to the reformed gas, it is preferable to arrange gas diffusion plates GX of porous material on a plurality of positions in the selective oxidizing unit 200F.

Figure 21:
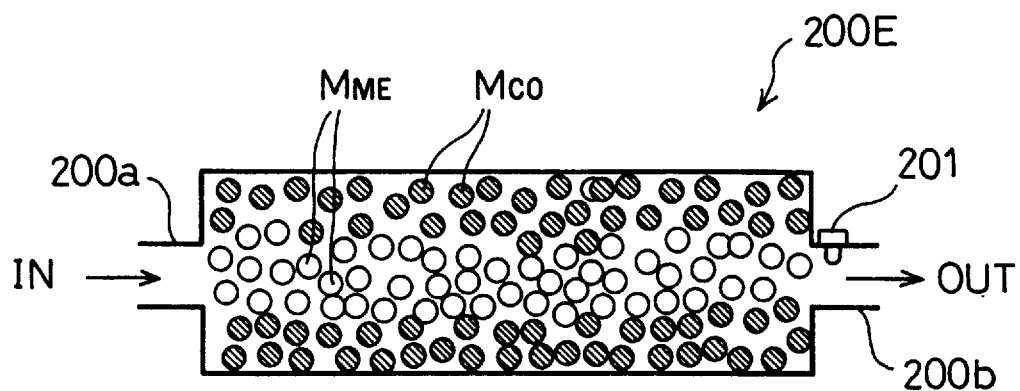
FIG. 21 is a schematic view illustrating an internal state of still another selective oxidizing unit 200E as a fourth modification of the selective oxidizing unit 200 of the third embodiment.
Figure 23:
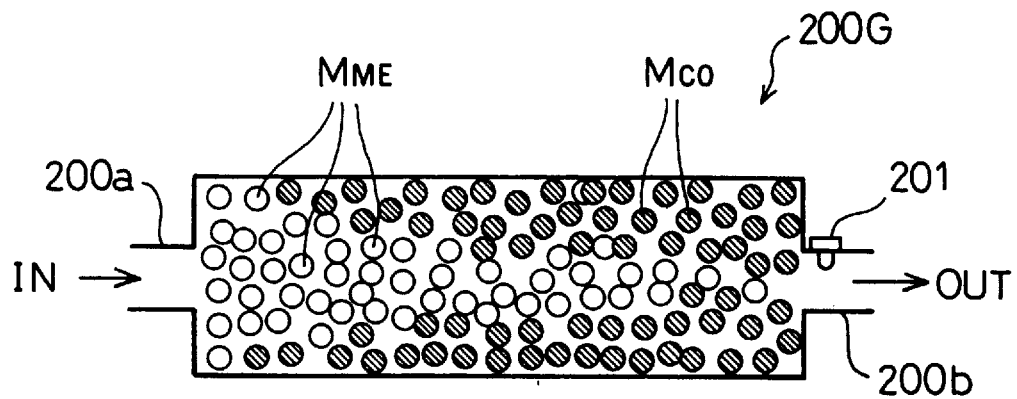
FIG. 23 is a schematic view illustrating an internal state of still another selective oxidizing unit 200G as a sixth modification of the selective oxidizing unit 200 of the third embodiment.

As illustrated in still another selective oxidizing unit 200G of FIG. 23, which is a sixth modified example of the selective oxidizing unit 200, the structure of FIG. 19 may be combined with the structure of FIG. 21. Namely, while the mixing ratio of the methanol-oxidizing catalyst MME to the CO-oxidizing catalyst MCO is varied successively, the methanol-oxidizing catalyst MME and the CO-oxidizing catalyst MCO are arranged respectively on the central portion and on the circumferential portion of the selective oxidizing unit 200G. This structure enables both the methanol-oxidizing catalyst MME and the CO-oxidizing catalyst MCO to be adequately controlled to the respective ranges of active temperature, even in the presence of a variation in loading or a variation in temperature of the reformed gas introduced into the selective oxidizing unit 200G. This structure can thus reduce the concentrations of methanol and carbon monoxide in the reformed gas with a high efficiency.

Figure 24:
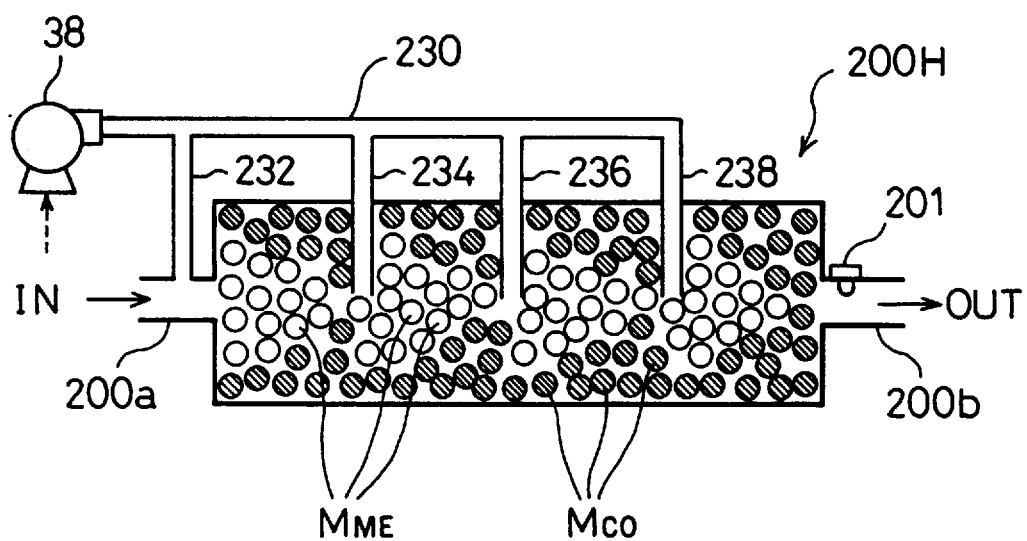
FIG. 24 is a schematic view illustrating an internal state of still another selective oxidizing unit 200H as a seventh modification of the selective oxidizing unit 200 of the third embodiment.

In the fuel cell system 10A of the third embodiment, the oxidizing gas is supplied to the connection conduit 36 via the induction pipe 39 to be mixed with the reformed gas. As illustrated in still another selective oxidizing unit 200H of FIG. 24, which is a seventh modified example of the selective oxidizing unit 200, the oxidizing gas may be introduced into the inlet 200a and a plurality of other places in the selective oxidizing unit 200H via a manifold 230 having branch pipes 232 through 238. Since the oxidizing reactions of methanol and carbon monoxide are exothermic and high temperatures are expected in the vicinity of the outlets of the oxidizing gas, it is preferable to arrange the methanol-oxidizing catalyst MME, which is activated at relatively high temperatures, in the vicinity of the outlets of the oxidizing gas and the CO-oxidizing catalyst MCO apart from the outlets of the oxidizing gas. This structure enables both the methanol-oxidizing catalyst MME and the CO-oxidizing catalyst MCO to be controlled to the adequate temperature ranges, thereby efficiently reducing the methanol concentration CM and the carbon monoxide concentration CO of the reformed gas. The multi-stage induction of oxidizing gas is not restricted to the arrangement that the methanol-oxidizing catalyst MME is near the outlets of the oxidizing gas and the CO-oxidizing catalyst MCO apart from the outlets, but may be applied to any other arrangement, for example, the homogeneous arrangement of FIG. 13, the separate arrangement of FIG. 18, and the varying arrangement of FIG. 19.

In the structure of the third embodiment, any one of the selective oxidizing unit 200 and the modified selective oxidizing units 200B through 200H is combined with the reformer unit 32, which reforms methanol and produces a hydrogen-rich gas. The methanol oxidizing unit 200 reduces the concentrations of methanol and carbon monoxide in any hydrogen-rich gas containing methanol and carbon monoxide. The methanol oxidizing unit 200 or any of its modifications 200B through 200H may accordingly be combined with any hydrogen-rich gas supply mechanisms other than the reformer unit 32.

The above embodiments are only illustrative and not restrictive in any sense. There may be many other modifications, alterations, and changes without departing from the scope or spirit of essential characteristics of the invention. The scope and spirit of the present invention are limited only by the terms of the appended claims.

At is claimed is:

1. An apparatus for reducing the concentration of carbon monoxide in a hydrogen-rich gas which contains hydrogen, carbon monoxide, and methanol wherein the carbon monoxide and methanol have lower concentrations than the hydrogen, said apparatus comprising:
    oxidizing gas introduction means for introducing an oxygen-containing oxidizing gas into the hydrogen-rich gas; and
    a preferential oxidizing unit containing a platinum-ruthenium alloy catalyst for accelerating oxidation of the carbon monoxide in the hydrogen-rich gas by the oxidizing gas preferentially over oxidation of the hydrogen in the hydrogen-rich gas.

2. An apparatus in accordance with claim 1, said apparatus further comprising:
    methanol concentration measuring means for measuring concentration of the methanol in the hydrogen-rich gas;
    carbon monoxide concentration measuring means for measuring concentration of the carbon monoxide in the hydrogen-rich gas; and
    oxidizing gas control means for controlling an amount of the oxidizing gas introduced into the hydrogen-rich gas by said oxidizing gas introduction means, based on the concentration of the methanol in the hydrogen-rich gas measured by said methanol concentration measuring means and the concentration of the carbon monoxide in the hydrogen-rich gas measured by said carbon monoxide concentration measuring means.

3. An apparatus for reducing the concentration of carbon monoxide in a hydrogen-rich gas which contains hydrogen, carbon monoxide, and methanol wherein the carbon monoxide and methanol have lower concentrations than the hydrogen, said apparatus comprising:
    oxidizing gas introduction means for introducing an oxygen-containing oxidizing gas into the hydrogen-rich gas; and
    an oxidizing unit having an inlet and an outlet for the hydrogen-rich gas and containing a methanol-oxidizing catalyst and a carbon monoxide-oxidizing catalyst, the methanol-oxidizing catalyst accelerating oxidation of the methanol in the hydrogen-rich gas by the oxidizing gas preferentially over oxidation of the hydrogen in the hydrogen-rich gas, the carbon monoxide-oxidizing catalyst accelerating oxidation of the carbon monoxide in the hydrogen-rich gas by the oxidizing gas preferentially over hydrogen in the hydrogen-rich gas.

4. An apparatus in accordance with claim 3, wherein said methanol-oxidizing catalyst and said carbon monoxide-oxidizing catalyst are homogeneously mixed in said oxidizing unit.

5. An apparatus in accordance with claim 4, said apparatus further comprising:
    cooling means having a circulation path through which a cooling medium flows, said cooling means cooling said oxidizing unit.

6. An apparatus in accordance with claim 4, said apparatus further comprising:
    cooling means having a circulation path through which a cooling medium flows, said cooling means cooling said oxidizing unit.

7. An apparatus in accordance with claim 3, wherein said methanol-oxidizing catalyst and said carbon monoxide-oxidizing catalyst are arranged in a gradient in said oxidizing unit such that the amount of methanol-oxidizing catalyst near the inlet of the hydrogen-rich gas is greater than the amount of said carbon monoxide-oxidizing catalyst, and at the outlet of hydrogen-rich gas the amount of carbon monoxide-oxidizing catalyst is greater than the amount of methanol-oxidizing catalyst.

8. An apparatus in accordance with claim 3, said apparatus further comprising:
    cooling means having a circulation path for a cooling medium, said cooling medium being circulated through said circulation path to cool said oxidizing unit,
    wherein the ratio of the amount of said methanol-oxidizing catalyst to said carbon monoxide-oxidizing catalyst is greatest near said circulation path.

9. An apparatus in accordance with claim 8, wherein said circulation path enables the cooling medium to flow from near the outlet of said oxidizing unit to near the inlet of the said oxidizing unit.

10. An apparatus in accordance with claim 3, wherein said oxidizing gas introduction means comprises a plurality of fluid inlets penetrating into said oxidizing unit for introducing the oxidizing gas into said oxidizing unit, and wherein the ratio of the amount of said methanol-oxidizing catalyst to said carbon monoxide-oxidizing catalyst is greatest at a place in said oxidizing unit near said plurality of fluid inlets.

11. An apparatus in accordance with claim 3, said apparatus further comprising:
    methanol concentration measuring means for measuring concentration of the methanol in the hydrogen-rich gas;
    carbon monoxide concentration measuring means for measuring concentration of the carbon monoxide in the hydrogen-rich gas; and oxidizing gas control means for controlling an amount of the oxidizing gas introduced into the hydrogen-rich gas by said oxidizing gas introduction means, based on the concentration of the methanol in the hydrogen-rich gas measured by said methanol concentration measuring means and the concentration of the carbon monoxide in the hydrogen-rich gas measured by said carbon monoxide concentration measuring means.

12. An apparatus according to claim 3, wherein said methanol-oxidizing catalyst is ruthenium optionally on a support and said carbon monoxide-oxidizing catalyst is a platinum-ruthenium alloy optionally on a support.

13. An apparatus for reducing the concentration of methanol in a hydrogen-rich gas which contains hydrogen and methanol, wherein the methanol has a lower concentration than the hydrogen, said apparatus comprising:

oxidizing gas introduction means for introducing an oxygen-containing oxidizing gas into the hydrogen-rich gas; and a preferential oxidizing unit containing a platinum-ruthenium alloy catalyst for accelerating oxidation of the methanol in the hydrogen-rich gas by the oxidizing gas preferentially over oxidation of the hydrogen in the hydrogen-rich gas.

14. An apparatus in accordance with claims 13, said apparatus further comprising:

methanol concentration measuring means for measuring concentration of the methanol in the hydrogen-rich gas; and oxidizing gas control means for controlling an amount of the oxidizing gas introduced into the hydrogen-rich gas by said oxidizing gas introduction means, based on the concentration of the methanol in the hydrogen-rich gas measured by said methanol concentration measuring means.

15. A fuel reformer system for reforming methanol to a hydrogen-containing gaseous fuel, said fuel reformer system comprising:

a reformer unit for producing a reformed gas from methanol, the reformed gas containing hydrogen, carbon monoxide and methanol;

oxidizing gas introduction means for introducing an oxygen-containing oxidizing gas into the reformed gas; and a preferential oxidizing unit containing a platinum-ruthenium alloy catalyst for accelerating oxidation of the carbon monoxide in the reformed gas preferentially over oxidation of the hydrogen in the reformed gas.

16. A fuel reformer system in accordance with claim 15, said fuel reformer system further comprising:

methanol concentration measuring means for measuring concentration of methanol in the reformed gas;

carbon monoxide concentration detection means for measuring concentration of carbon monoxide in the reformed gas; and oxidizing gas control means for controlling an amount of the oxidizing gas introduced into the reformed gas by said oxidizing gas introduction means, based on the concentration of the methanol in the reformed gas measured by said methanol concentration measuring means and the concentration of the carbon monoxide in the reformed gas measured by said carbon monoxide concentration measuring means.

17. A fuel reformer system for reforming methanol to a hydrogen-containing gaseous fuel, said fuel reformer system comprising:

a reformer unit for producing a reformed gas from methanol, the reformed gas containing hydrogen, carbon monoxide and methanol;

oxidizing gas introduction means for introducing an oxygen-containing oxidizing gas into the reformed gas; and an oxidizing unit having an inlet and an outlet for the reformed gas, and containing a platinum-ruthenium alloy catalyst which catalyzes the oxidation of methanol and carbon monoxide, the catalyst accelerating the oxidation of both the methanol and the carbon monoxide in the reformed gas by the oxidizing gas preferentially over oxidation of the hydrogen in the reformed gas.

18. A fuel reformer system in accordance with claim 17, wherein said methanol-oxidizing catalyst and said carbon monoxide-oxidizing catalyst are homogeneously mixed in said oxidizing unit.

19. A fuel reformer system in accordance with claim 18, said fuel reformer system further comprising:

cooling means having a circulation path, through which a cooling medium flows from proximity to the outlet to proximity to the inlet of said oxidizing unit, said cooling means cooling said oxidizing unit by the cooling medium.

20. A fuel reformer system in accordance with claim 17, wherein said methanol-oxidizing catalyst and said carbon monoxide-oxidizing catalyst are arranged in a gradient in said oxidizing unit such that the amount of methanol-oxidizing catalyst near the inlet of the reformed gas is greater than the amount of said carbon monoxide-oxidizing catalyst and at the outlet of the reformed gas the amount of carbon monoxide-oxidizing catalyst is greater than the amount of methanol-oxidizing catalyst.

21. A fuel reformer system in accordance with claim 20, said fuel reformer system further comprising:

cooling means having a circulation path, through which a cooling medium flows, said cooling means cooling said oxidizing unit.

22. A fuel reformer system in accordance with claim 17, said fuel reformer system further comprising:

cooling means having a circulation path for a cooling medium, said cooling medium being circulated through said circulation path to cool said oxidizing unit, wherein the ratio of the amount of said methanol-oxidizing catalyst to said carbon monoxide-oxidizing catalyst is greatest near said circulation path.

23. A fuel reformer system in accordance with claim 22, wherein said circulation path of said cooling means enables the cooling medium to flow from near the outlet of said oxidizing unit to near the inlet of the said oxidizing unit.

24. A fuel reformer system in accordance with claim 17, wherein said oxidizing gas introduction means comprises a plurality of fluid inlets penetrating into said oxidizing unit for introducing the oxidizing gas into said oxidizing unit, and wherein the ratio of the amount of said methanol-oxidizing catalyst to said carbon monoxide-oxidizing catalyst is greatest at a place in said oxidizing unit near said plurality of fluid inlets.

25. A fuel reformer system in accordance with claims 17, said fuel reformer system further comprising:

methanol concentration measuring means for measuring concentration of the methanol in the reformed gas;

carbon monoxide concentration measuring means for measuring concentration of the carbon monoxide in the reformed gas; and oxidizing gas control means for controlling an amount of the oxidizing gas introduced into the reformed gas by said oxidizing gas introduction means, based on the concentration of the methanol in the reformed gas measured by said methanol concentration measuring means and the concentration of the carbon monoxide in the reformed gas measured by said carbon monoxide concentration measuring means.

26. The fuel reformer system according to claim 17, wherein said methanol-oxidizing catalyst is ruthenium optionally on a support and said carbon monoxide-oxidizing catalyst is a platinum-ruthenium alloy optionally on a support.

27. A fuel reformer system for reforming methanol to a hydrogen-containing gaseous fuel, said fuel reformer system comprising:

a reformer unit for producing a reformed gas from methanol, the reformed gas containing hydrogen, carbon monoxide and methanol;

oxidizing gas introduction means for introducing an oxygen-containing oxidizing gas into the reformed gas; and a preferential oxidizing unit containing a platinum-ruthenium alloy catalyst for accelerating oxidation of the methanol in the reformed gas by the oxidizing gas preferentially over oxidation of the hydrogen in the reformed gas.

28. A fuel reformer system in accordance with claim 27, said fuel reformer system further comprising:

methanol concentration measuring means for measuring concentration of the methanol in the reformed gas; and oxidizing gas control means for controlling an amount of the oxidizing gas introduced into the reformed gas by said oxidizing gas introduction means, based on the concentration of the methanol in the reformed gas measured by said methanol concentration measuring means.

29. A fuel reformer system in accordance with claim 27, said fuel reformer system further comprising:

carbon monoxide-preferential oxidizing unit for receiving the oxidizing gas and a methanol-poor concentration-reformed gas which has been preferentially oxidized in said methanol-preferential oxidizing unit, and oxidizing carbon monoxide in the methanol-poor concentration-reformed gas preferentially over hydrogen.

30. A fuel reformer system in accordance with claim 29, said fuel reformer system further comprising:

methanol concentration measuring means for measuring concentration of the methanol in the reformed gas; and first oxidizing gas control means for controlling an amount of the oxidizing gas introduced into the reformed gas by said oxidizing gas introduction means, based on the concentration of the methanol in the reformed gas measured by said methanol concentration measuring means, carbon monoxide concentration measuring means for measuring concentration of carbon monoxide in the methanol-poor concentration-reformed gas; and second oxidizing gas control means for controlling an amount of the oxidizing gas introduced into the methanol-poor concentration-reformed gas in said carbon monoxide-preferential oxidizing unit, based on the concentration of carbon monoxide in the methanol-poor concentration-reformed gas measured by said carbon monoxide concentration measuring means.

* * * * *